(12) United States Patent
Yamamoto

(10) Patent No.: US 9,158,448 B2
(45) Date of Patent: Oct. 13, 2015

(54) PORTABLE TERMINAL, CONTROL METHOD AND PROGRAM

(75) Inventor: Yudai Yamamoto, Daito (JP)

(73) Assignee: KYOCERA Corporation, Kyoto (JP)

( * ) Notice: Subject to any disclaimer, the term of this patent is extended or adjusted under 35 U.S.C. 154(b) by 630 days.

(21) Appl. No.: 13/475,591

(22) Filed: May 18, 2012

(65) Prior Publication Data

US 2012/0293433 A1    Nov. 22, 2012

(30) Foreign Application Priority Data

May 20, 2011    (JP) ................. 2011-113201

(51) Int. Cl.
*G06F 3/041*    (2006.01)
*G06F 3/0488*    (2013.01)

(52) U.S. Cl.
CPC .......... *G06F 3/0488* (2013.01); *G06F 3/04886* (2013.01)

(58) Field of Classification Search
None
See application file for complete search history.

(56) References Cited

U.S. PATENT DOCUMENTS

| | | | |
|---|---|---|---|
| 5,914,718 A | 6/1999 | Chiu et al. | |
| 7,705,833 B2 * | 4/2010 | Kim .............................. | 345/173 |
| 2007/0097092 A1 * | 5/2007 | Jung et al. ..................... | 345/173 |
| 2007/0222769 A1 | 9/2007 | Otsuka et al. | |

FOREIGN PATENT DOCUMENTS

| | | |
|---|---|---|
| EP | 1837748 A1 | 9/2007 |
| JP | 9-134270 A | 5/1997 |
| JP | H10-105364 A | 4/1998 |
| JP | 2003-323258 A | 11/2003 |
| JP | 2007-257220 A | 10/2007 |
| JP | 2008-028785 A | 2/2008 |

OTHER PUBLICATIONS

An Office Action; "Notice of Reasons for Rejection," issued by the Japanese Patent Office on Sep. 30, 2014, which corresponds to Japanese Patent Application No. 2011-113201 and is related to U.S. Appl. No. 13/475,591; with English language concise explanation.

* cited by examiner

*Primary Examiner* — Kenneth B Lee, Jr.
(74) *Attorney, Agent, or Firm* — Studebaker & Brackett PC

(57) ABSTRACT

There is provided a portable terminal including a display panel having a display surface with a touch pad, an area management unit which defines a plurality of display areas formed by dividing the display surface, and a display control unit which performs control on an image display in each display area. In a state where two display areas are defined with a first boundary line, in response to a touch operation on the touch pad, the area management unit determines, based on a touch position of the touch operation, a second boundary line passing one point on the first boundary line and one point within a predetermined range from the touch position and defines two areas which are formed by dividing an object area of the two display areas with the second boundary line, as first and second display areas in place of the object area.

11 Claims, 15 Drawing Sheets

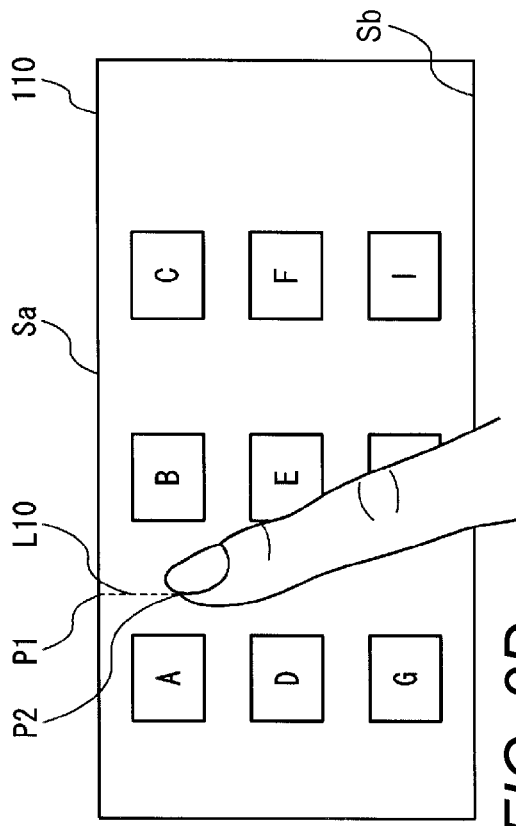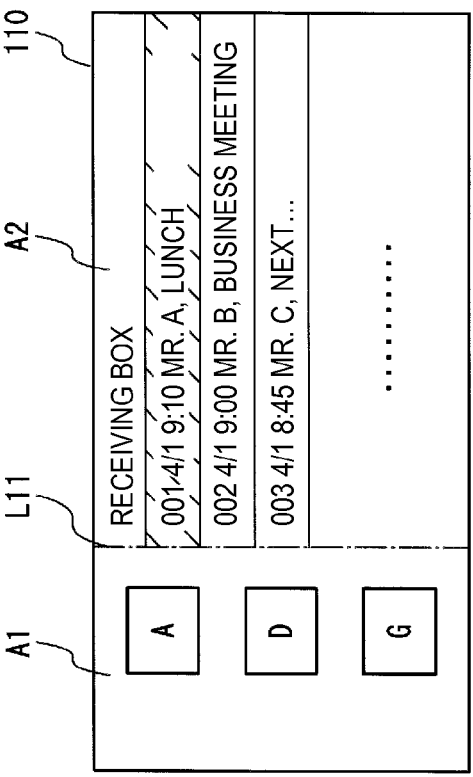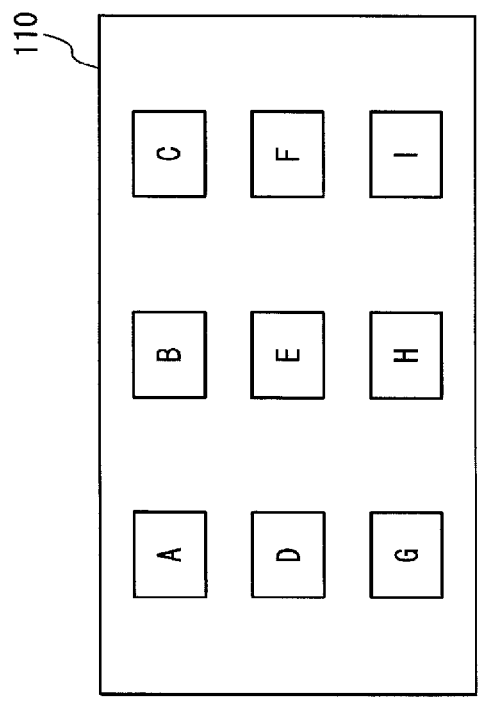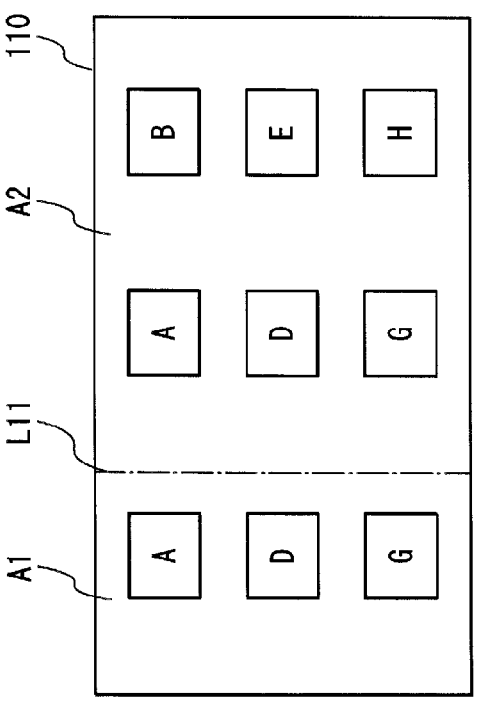

AREA MANAGEMENT TABLE

| AREA ID | LEFT-UPPER COORDINATE VALUE | RIGHT-LOWER COORDINATE VALUE | FURTHER DIVIDED AREA ID |
|---|---|---|---|
| 1 | (0, 0) | (x11, 479) | – |
| 2 | (x12, 0) | (799, 479) | – |

EXAMPLE OF TWO DISPLAY AREAS

AREA MANAGEMENT TABLE

| AREA ID | LEFT-UPPER COORDINATE VALUE | RIGHT-LOWER COORDINATE VALUE | FURTHER DIVIDED AREA ID |
|---|---|---|---|
| 1 | (0, 0) | (x11, 479) | – |
| 2 | (x12, 0) | (799, 479) | 3, 4 |
| 3 | (x12, 0) | (799, y11) | – |
| 4 | (x12, y12) | (799, 479) | – |

EXAMPLE OF THREE DISPLAY AREAS

FIG. 10

BOUNDARY LINE MANAGEMENT TABLE

| BOUNDARY LINE ID | FIRST COORDINATE VALUE | SECOND COORDINATE VALUE | DIVIDED AREA ID |
|---|---|---|---|
| 1 | (x12-1, 0) | (x12-1, 479) | 1, 2 |
| 2 | (x12, y12-1) | (799, y12-1) | 3, 4 |

AREA MANAGEMENT TABLE

| AREA ID | LEFT-UPPER COORDINATE VALUE | RIGHT-LOWER COORDINATE VALUE | FURTHER DIVIDED AREA ID |
|---|---|---|---|
| 1 | (0, 0) | (x11, 479) | 3, 4 |
| 2 | (x12, 0) | (799, 479) | 5, 6 |
| 3 | (0, 0) | (x11, y11) | – |
| 4 | (0, y12) | (x11, 479) | – |
| 5 | (x12, 0) | (799, y11) | – |
| 6 | (x12, y12) | (799, 479) | – |

BOUNDARY LINE MANAGEMENT TABLE

| BOUNDARY LINE ID | FIRST COORDINATE VALUE | SECOND COORDINATE VALUE | DIVIDED AREA ID |
|---|---|---|---|
| 1 | (x12-1, 0) | (x12-1, 479) | 1, 2 |
| 2 | (0, y12-1) | (799, y12-1) | 3, 4, 5, 6 |

EXAMPLE OF FOUR DISPLAY AREAS

PORTABLE TERMINAL, CONTROL METHOD AND PROGRAM

CROSS-REFERENCE TO RELATED APPLICATION

This application claims priority from Japanese Patent Application No. 2011-113201, filed on May 20, 2011, the entire subject matter of which is incorporated herein by reference.

BACKGROUND OF THE INVENTION

1. Field of the Invention

The present invention relates to a portable terminal such as portable phone including a display panel having a touch pad, and more particularly, to an improvement on a user interface.

2. Description of the Related Art

There has been known a technique of dividing a display surface of a display panel into a plurality of display areas, each of which is a unit of performing control relating to an image display, in a portable terminal such as portable phone (for example, refer to JP-A-H9-134270 or JP-A-2008-28785). According to the technique disclosed in JP-A-H9-134270, a user drags an icon at a left end on a screen to a right end in a horizontal direction on a display panel having a touch pad, thereby dividing a display surface into two upper and lower display areas. Then, in the respective display areas, schedules having different time units such as schedule of one day and schedule of one week are displayed.

Also, according to the technique disclosed in JP-A-2008-28785, a display screen of a television receiver is divided into three display areas at predetermined positions and different images (two different program images and a web screen, and the like) are displayed in the respective display areas.

According to the above techniques, the user can see the images displayed in the respective display area at the same time without performing an operation of replacing a display object image.

In recent years, portable terminals having a relatively large screen size have been used. Hence, it is thought that it is useful to divide the display surface into more display areas and to see the images displayed in the respective display areas at the same time.

SUMMARY OF THE INVENTION

Accordingly, an aspect of the present invention is to provide a portable terminal which enables the number of divisions to be increased when a display surface of a display panel has been already divided into two, in order for user convenience.

According to an illustrative embodiment of the present invention, there is provided a portable terminal comprising: a display panel including a display surface having a touch pad; an area management unit which defines a plurality of display areas formed by dividing the display surface in response to a touch operation on the touch pad; and a display control unit which performs control on an image display in each of the display areas formed by dividing the display surface. In a state where two display areas are defined by dividing the display surface with a first boundary line, in response to a touch operation on the touch pad, the area management unit determines, based on a touch position of the touch operation, a second boundary line passing one point on the first boundary line and one point within a predetermined range from the touch position and defines two areas which are formed by dividing an object area of the two display areas with the second boundary line, as first and second display areas in place of the object area, the object area including one point within a predetermined range from the touch position.

According to the above configuration, when the display surface of the display panel has been already divided into two, it is possible to increase the number of divisions.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIGS. 2A to 2D show an example of a dividing operation and a display example of a display panel 110 when dividing a display surface of the display panel 100 into a plurality of display areas;

FIG. 10 shows a data configuration and a content example of a boundary line management table 20;

DETAILED DESCRIPTION OF THE INVENTION

Hereinafter, a portable phone which is an example of a portable terminal according to an illustrative embodiment of the present invention will be described.

Illustrative Embodiments

<1. Outline>

Figure 1:
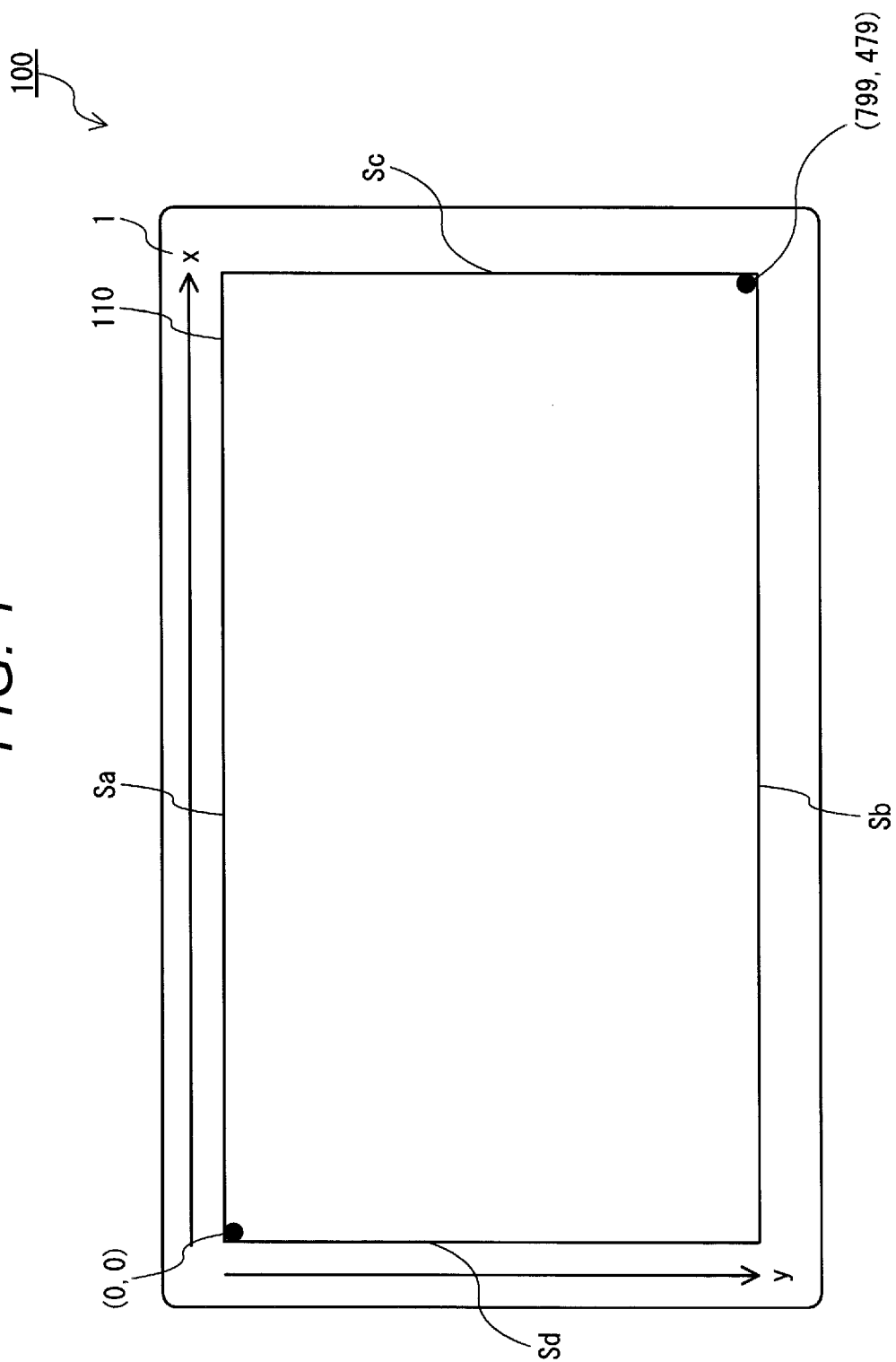
FIG. 1 is a front view showing an outer appearance of a portable phone 100 according to an illustrative embodiment.

FIG. 1 is a front view showing an outer appearance of a portable phone 100 according to an illustrative embodiment.

As shown in FIG. 1, the portable phone 100 is a terminal including a display panel 110 having a touch pad, which is provided to a case 1.

The portable phone 100 allows a user to perform a predetermined operation on the touch pad, thereby dividing a display surface of the display panel 110 into a plurality of display areas and combining the plurality of display areas. Here, the display area refers to a unit, for which the portable phone 100 performs control on an image display.

That is, according to the portable phone 100, it is possible to divide the display surface of the display panel 110 into the display areas having positions and number which the user desires and to respectively display images relating to a plurality of applications in the respective display areas at the same time. Thereby, even though the user does not perform an operation of switching the display into an image of a desired application, the user can see the image of the application. Also, the user can operate one application while seeing an image of another application.

In the below, a user operation of dividing the display surface of the display panel 110 into a plurality of display areas is referred to as a "dividing operation" and a user operation of combining the plurality of display areas is referred to as a "combining operation."

<2. User Interface Specification>

Subsequently, display examples and operation examples of the portable phone 100 are described with reference to FIGS. 2 to 5. In FIGS. 2 to 5, only a screen example of the portable phone 100 is shown, and the case 1 and the like of the portable phone 100 are not shown.

<2-1. Dividing>

First, an example is described in which one area (the whole display surface of the display panel 110 or one display area) is divided into two display areas by the dividing operation. FIGS. 2A to 2D show an example of the dividing operation and a display example of the display panel 110 when dividing the display surface of the display panel 100 into two display areas.

FIG. 2A shows an example where an image (hereinafter, referred to as "menu image") including icons A to I is display on the display panel 110. At this state, as shown in FIG. 2B, when the user moves (so-called drag operation) a finger from a vicinity of a side Sa of the display panel 110, which is a starting position of a touch, toward a side Sb while the finger being touched on the display panel, a line L10 is displayed.

The line L10 is a straight line which is displayed in correspondence to the touch position of the user's finger during the dividing operation, and has, as a starting point, an intersection point P1 between a normal line to the side Sa, which passes the vicinity of the side Sa at which the user starts the touch of the finger, and the side Sa, and a current touch position P2 of the finger in the normal line direction, as an ending point. The line L10 is displayed as a length corresponding to the touch position of the finger. By confirming the line L10, the user can easily understand at which position of the display surface of the display panel 100 the display surface can be divided by the dividing operation to be currently operated.

When the user separates the touching finger in the vicinity of the side Sb, the display surface of the display panel 110 is divided into two display areas A1 and A2 and a line L11 indicative of a boundary line between the display areas A1 and A2 is displayed, as shown in FIG. 2C. In addition, in this example, the line L11 is shown with a line different from the line L10 shown in FIG. 2B. Thereby, it is possible to easily understand whether the current state is a state under dividing operation or a state where the dividing operation is over and the display surface is divided into the display areas A1 and A2.

Also, the icons A, D, G are displayed in the display area A1 of FIG. 2C and the icons A, B, D, E, G, H are displayed in the display area A2. That is, parts of the menu image shown in FIG. 2A are displayed in the display areas A1 and A2. From the above state, when the user performs predetermined operations in the respective display areas, the portable phone 100 performs a scroll display and also can display other icons which are not shown in FIG. 2C.

While not limited to the example of FIG. 2C, in a case where a whole image of any one application is not displayed in each display area, when the user performs the above predetermined operation, the portable phone 100 performs the scroll display. In addition, when a size of the display area is a size or larger of a display object image, the whole image of the display object is displayed in the display area and the portable phone 100 does not particularly perform the scroll display even though the user performs the above operation.

At the state of FIG. 2C, when the user touches the finger and the like on a display position of the icon B in the display area A2, for example, the portable phone 100 activates an application (a mail application, in this example) corresponding to the icon B and displays an image (an image of a received mail list, in this example) of the application in the display area A2, as shown in FIG. 2D.

Figure 3A:
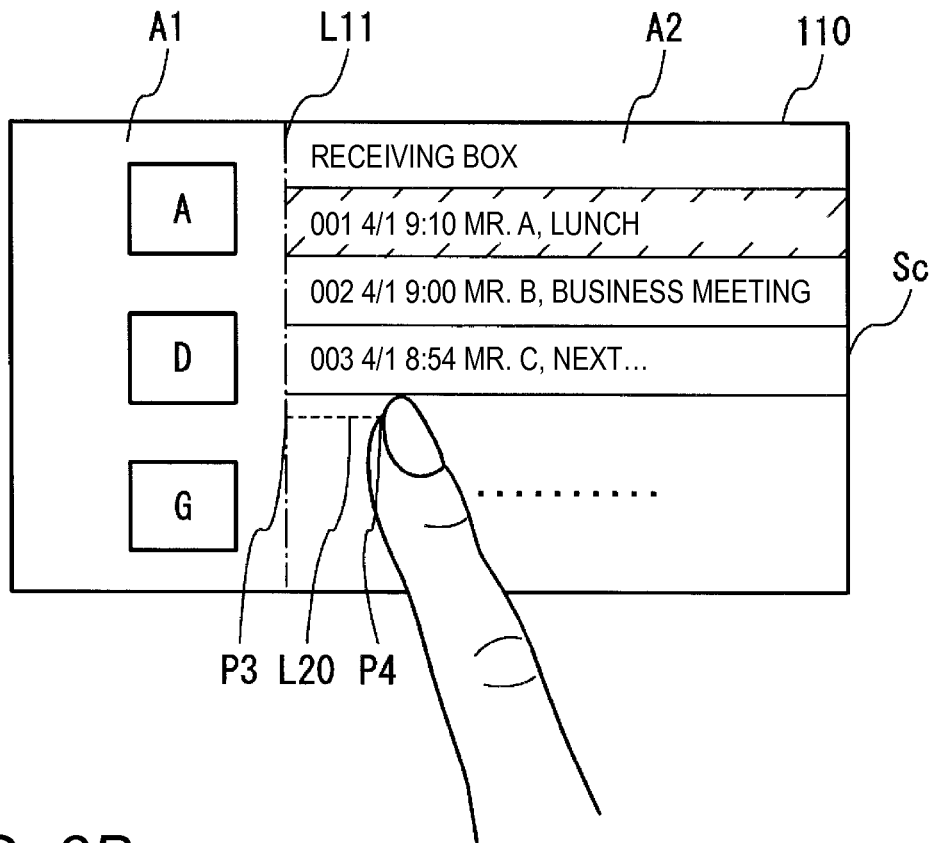
FIGS. 3A and 3B show an example of a dividing operation and a display example of the display panel 110 when dividing a display area A2 into two display areas.
Figure 3B:
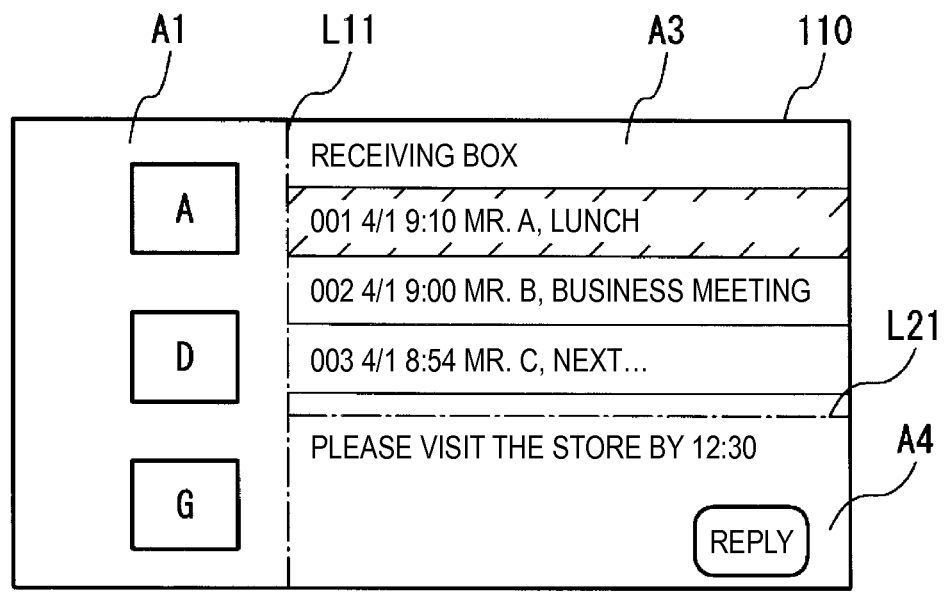

Meanwhile, the operation of touching a finger and the like on a display position of an icon is referred to as an "icon selection operation." FIGS. 3A and 3B show an example of the dividing operation and a display example of the display panel 110 when dividing the display area A2 into two display areas. At a state of FIG. 2D, as shown in FIG. 3A, when the user moves a finger from a vicinity of the line L11 (which is a boundary line between the display areas A1 and A2), which is a starting position of a touch, toward a side Sc while the finger being touched on the display panel, a line L20 is displayed.

Like the line L10 of FIG. 2B, the line L20 is a straight line which is displayed in correspondence to the touch position of the user's finger during the dividing operation. That is, the line L20 has, as a starting point, an intersection point P3 between a normal line to the line L11, which passes the vicinity of the line L11 at which the user starts the touch of the finger, and the line L11, and a current touch position P4 of the finger in the normal line direction, as an ending point, and is displayed as a length corresponding to the touch position of the finger.

When the user separates the touching finger in the vicinity of the side Sc, the display area A2 is divided into two display areas A3 and A4 by a line L21 and the line L21 is displayed, as shown in FIG. 3B. Like the line L11, the line L21 is a boundary line between the display areas A3 and A4 and is shown with a line different from the line L20 shown in FIG. 3A.

Also, a part of the image of the received mail list shown in FIG. 3A is shown in the display area A3 of FIG. 3B and a body text of a selected received mail (refer to the shaded portion) of the received mail list displayed in the display area A3 is displayed in the display area A4 of FIG. 3B. Also, it is determined what image is displayed in each display area obtained as a result of the dividing operation, based on an application relating to the image displayed in the display area before the division. That is, it is assumed that an image to be displayed in each display area obtained as a result of the dividing operation is predetermined for each application.

Also, in this example, an application relating to the menu image shown in FIG. 2A is also treated as one application, and in this application, a part of the menu image is displayed in each display area obtained by the dividing operation.

Figure 4A:
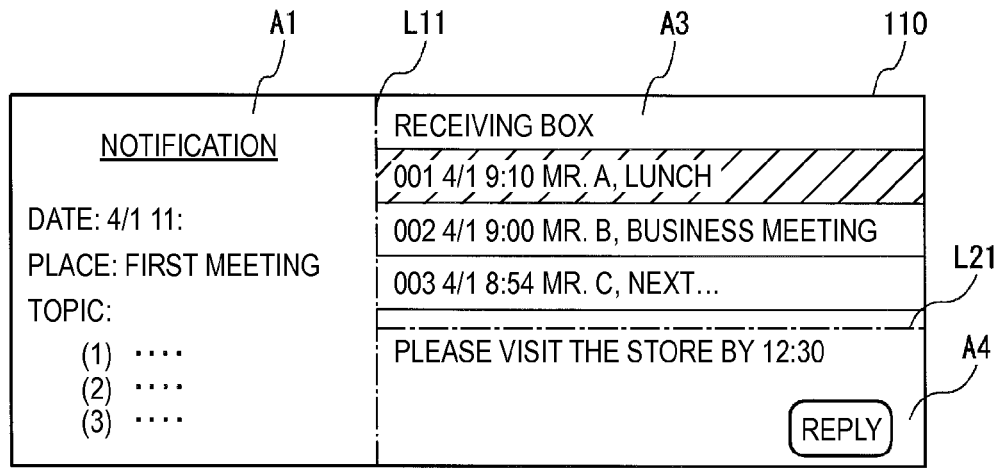
FIGS. 4A to 4C show an example of a dividing operation and a display example of the display panel 110 when dividing a display area A1 into two display areas.
Figure 4B:
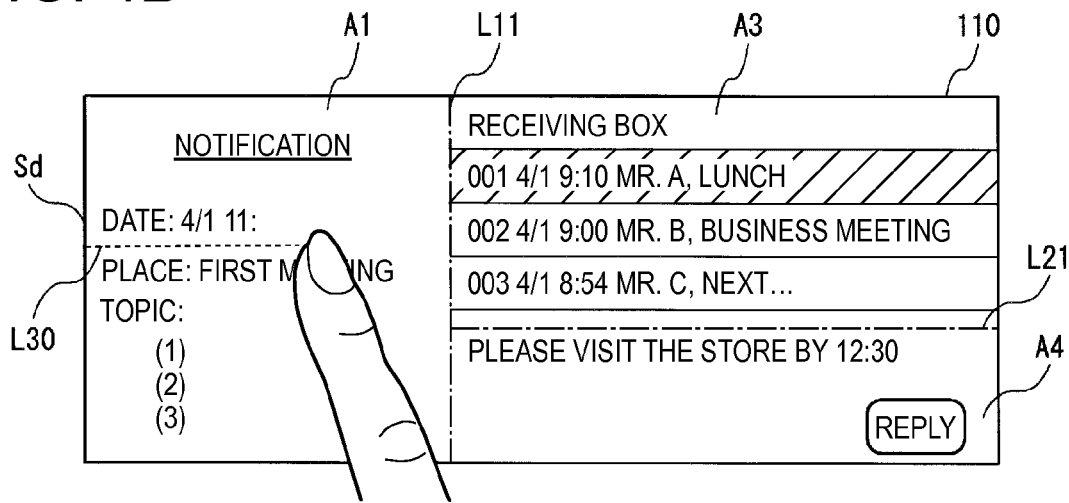

FIGS. 4A and 4B show an example of the dividing operation and a display example of the display panel 110 when dividing the display area A1 into two display areas. At a state of FIG. 3B, when the user selects the icon A in the display area A1, for example, the portable phone 100 activates an application (a document preparation application, in this example) corresponding to the icon A. Also, when the user opens a predetermined document file thereafter, an image (hereinafter, also referred to as "document image") of the document file opened in the application is displayed in the display area A1, as shown in FIG. 4A.

At this state, as shown in FIG. 4B, when the user moves a finger from a vicinity of a side Sd of the display panel 110, which is a starting position of a touch, toward the boundary line L11 while the finger being touched on the display panel, a line L30 is displayed. Like the line L10 of FIG. 2B or the line L20 shown in FIG. 3A, the line L30 is a straight line which is displayed in correspondence to the touch position of the user's finger during the dividing operation.

Figure 4C:
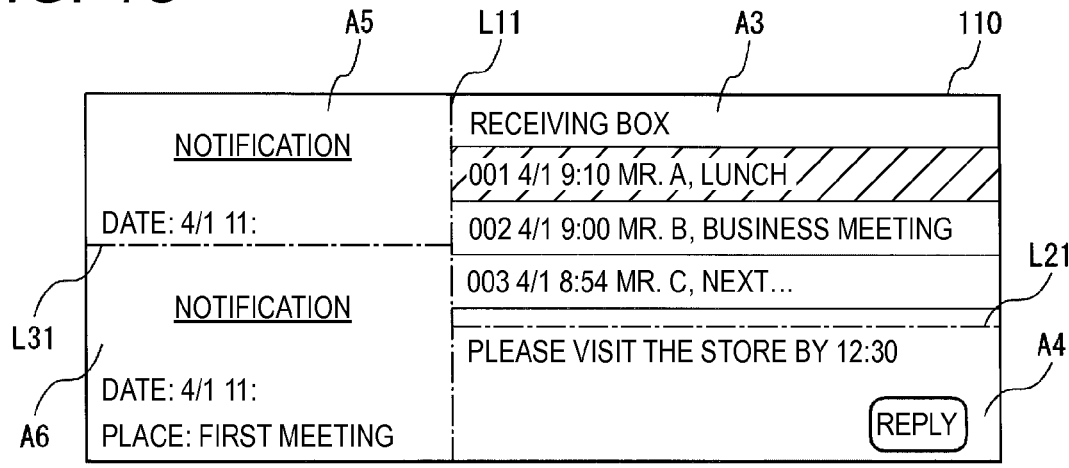

When the user separates the touching finger in the vicinity of the boundary line L11, the display area A1 is divided into two display areas A5 and A6 by a line L31, and the line L31 is displayed with a line different from the line L30, as shown in FIG. 4C. Like the lines L11 and L21, the line L31 is a boundary line between the display areas A5 and A6.

Similarly to the example shown in FIG. 2C, parts of the document image shown in FIG. 4B are respectively shown in the display areas A5 and A6. Also, in a case where the document is edited in either one of the display areas A5 and A6 and the edited part is displayed in the other, content after the edition is displayed. That is, the display areas A5 and A6 display data of the one document file, respectively.

Figure 5A:
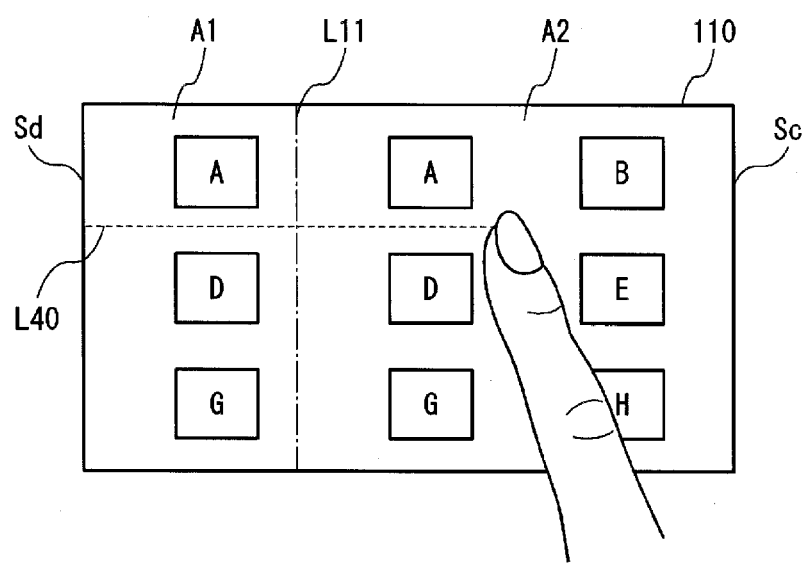
FIGS. 5A and 5B show an example of a dividing operation and a display example of the display panel 110 when dividing each of display areas A1 and A2 into two display areas.
Figure 5B:
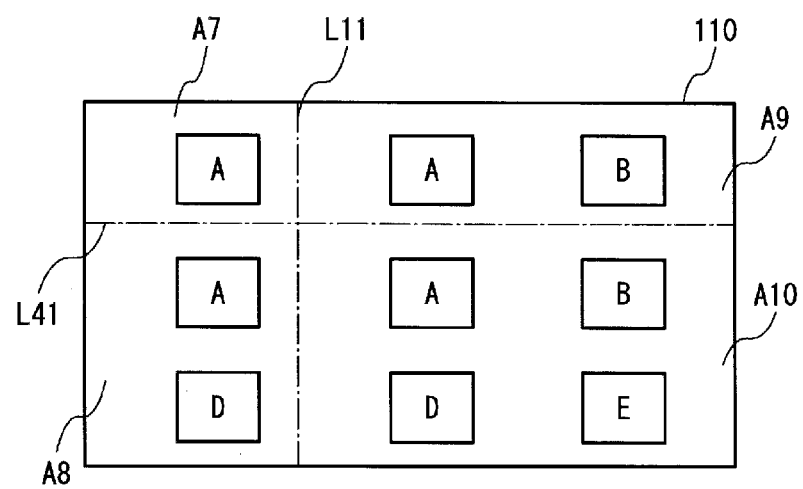

Subsequently, an example is described in which each of the two display areas is divided into two display areas by the dividing operation. FIGS. 5A and 5B show an example of the dividing operation and a display example of the display panel 110 when dividing each of the display areas A1 and A2 into two display areas. As shown in FIG. 5A, when the user moves a finger from the vicinity of the side Sd of the display panel 110, which is a starting position of a touch, toward the side Sc beyond the boundary line L11 while the finger being touched on the display panel, a line L40 is displayed.

Like the line L10 of FIG. 2B or the line L20 shown in FIG. 3A, the line LAO is a straight line which is displayed in correspondence to the touch position of the user's finger during the dividing operation. When the user separates the touching finger in the vicinity of the side Sc, each of the display areas A1 and A2 is divided into two display areas A7 to A10 by a line L41, as shown in FIG. 5B.

Similarly to the example shown in FIG. 2C, a part of the menu image shown in FIG. 5A is shown in each of the display areas A7 to A10. That is, according to the portable phone 100, it is possible to divide the display surface at the position which the user prefers by an intuitive operation of cutting the display surface of the display panel 110 and to display the images of the applications in the respective areas at the same time.

<2-2. Combining>

Figure 6A:
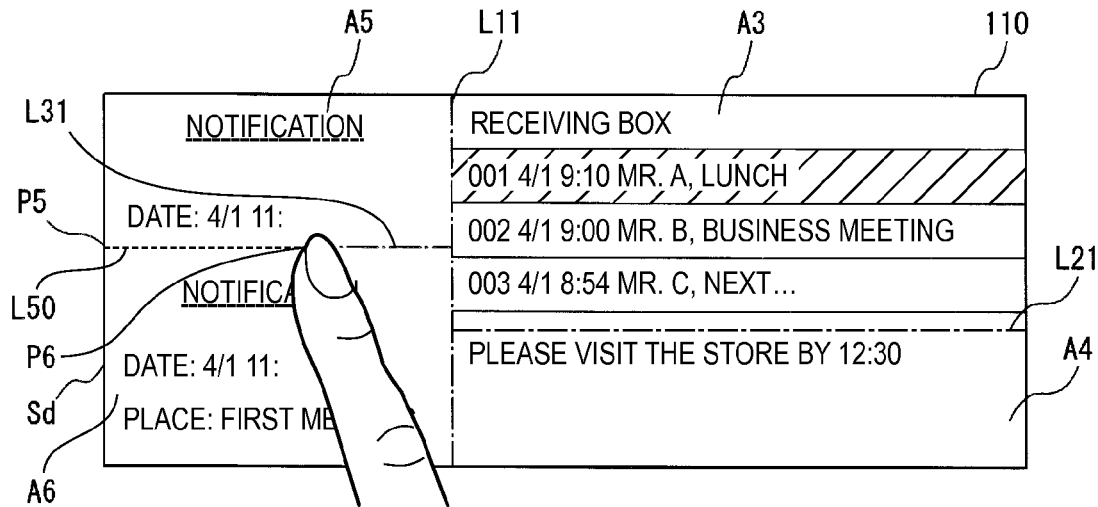
FIGS. 6A to 6C show an example of a combining operation and a display example of the display panel 110 when combining display areas A5 and A6 into one display area.
Figure 6B:
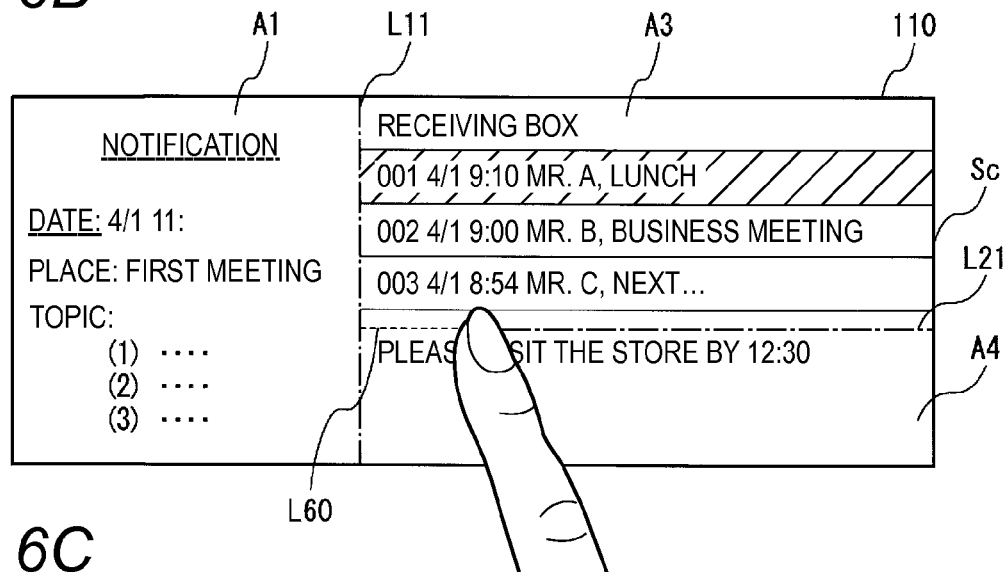
Figure 6C:
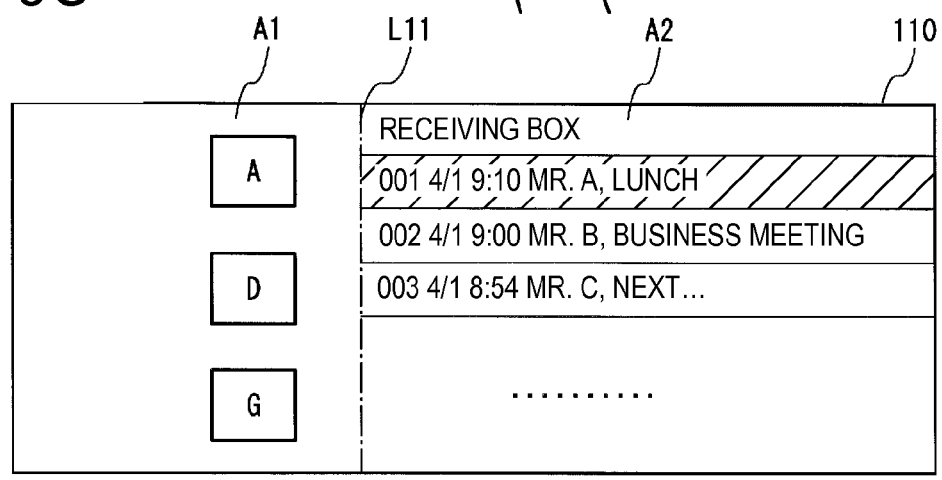

In the below, a case is described in which the two display areas are combined into one display area. FIGS. 6A to 6C show an example of a combining operation and a display example of the display panel 110 when combining the display areas A5, A6 into one display area.

As shown in FIG. 6A, when the user moves a finger from a vicinity of one end point of the boundary line L31, which is a starting position of a touch, toward the boundary line L11 along the boundary line L31 while the finger being touched on the display panel, a line L50 is displayed. The line L50 is a straight line which is displayed in correspondence to the touch position of the user's finger during the combining operation. That is, the line L50 has, as a starting point, an intersection point P5 between a normal line to the side Sd, which passes the vicinity of the one end point of the boundary line L31 at which the user starts the touch of the finger, and the side Sd, and a current touch position P6 of the finger in the normal line direction, as an ending point, and is displayed as a length corresponding to the touch position of the finger.

When the user separates the touching finger in the vicinity of the one end point of the boundary line L31, the display areas A5 and A6 are combined into one display area A1 and the boundary line L31 and the line L50 are not displayed, as shown in FIG. 6B. Here, the image relating to either one (A5, in this example) of the display areas A5 and A6 is displayed in the display area A1 of FIG. 6B.

Also, at this state, as shown in FIG. 6B, when the user moves the finger from a vicinity of one end point of the boundary line L21, which is a starting position of a touch, toward the side Sc along the boundary line L21 with the finger being touched on the display panel, a line L60 is displayed. The line L60 is a straight line which is displayed in correspondence to the touch position of the user's finger during the same combining operation as the line L50 of FIG. 5A.

When the user separates the touching finger in the vicinity of the other end point of the boundary line L21, the display areas A3 and A4 are combined into one display area A2 and the boundary line L21 and the line L60 are not displayed, as shown in FIG. 6C. Here, the image relating to either one (A3, in this example) of the display areas A3 and A4 is displayed in the display area A2 of FIG. 6B.

That is, according to the portable phone 100, when the display surface of the display panel 110 is divided into the display areas, the user performs an intuitive operation of following the displayed boundary line, thereby combining the display areas divided by the boundary line. Therefore, for example, it is possible to stop displaying the image of the application, which is not necessary to be displayed any more at the same time, and to enlarge and display the image of one application, which is necessary to be displayed, in one display area that is formed by combining the display areas divided by the boundary line.

<3. Functional Configuration>

Figure 7:
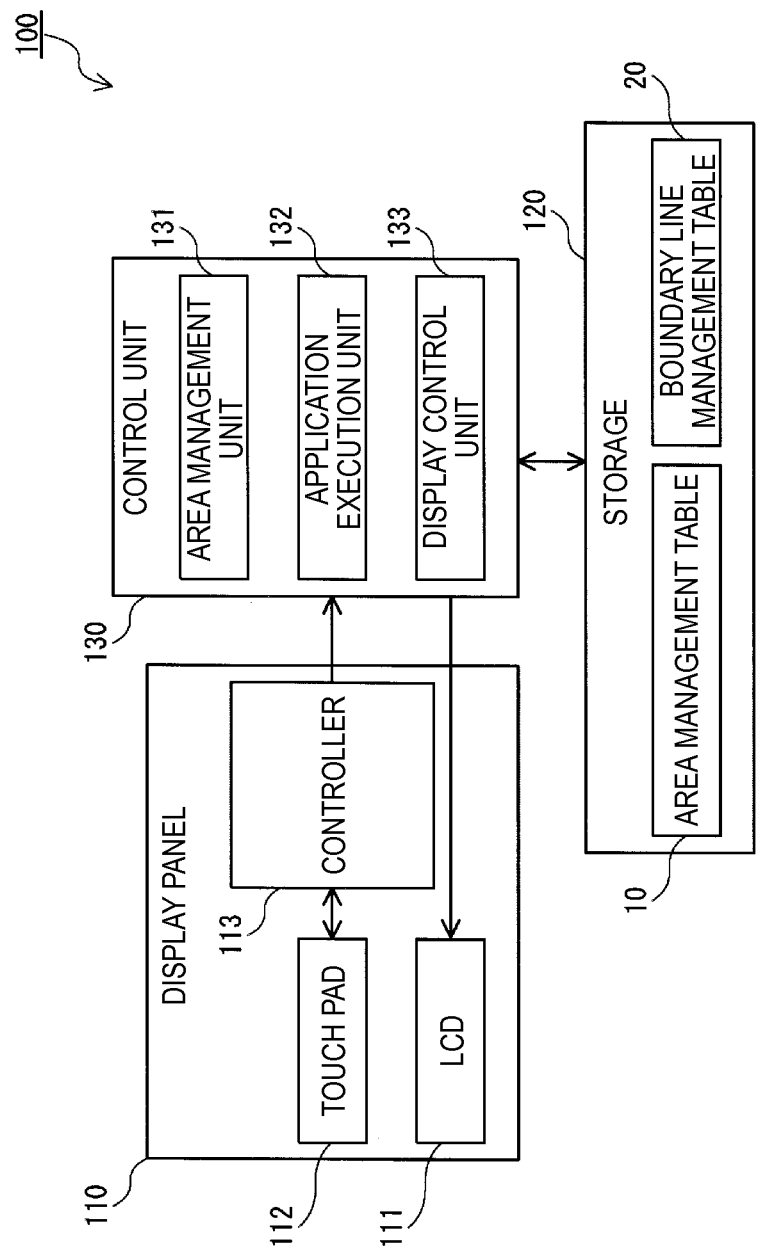
FIG. 7 is a block diagram showing functional configurations of the portable phone 100.

FIG. 7 is a block diagram showing functional configurations of main parts of the portable phone 100. As shown in FIG. 7, the portable phone 100 has the display panel 110, a storage 120 and a control unit 130. Also, the portable phone 100 has a communication unit, a speaker, a microphone and the like provided to a usual portable phone, which are not shown. Also, the portable phone 100 includes a processor and a memory. Functions of the control unit 130 are implemented as the processor executing programs stored in the memory.

Here, the display panel 110 includes a liquid crystal display (LCD) 111, a touch pad 112 and a controller 113. The touch pad 112 is implemented by a general electrostatic capacitance touch sensor and is provided to be overlapped on the LCD 111. The touch pad 112 is configured using a transparent member and is configured to allow an image displayed on the LCD 111 to be seen.

The controller 113 is an IC (Integrated Circuit) which detects a touch of a user's finger and the like on the touch pad 112 and outputs coordinate values (x, y) of the touch position on the touch pad 112 to the control unit 130 every predetermined time (for example, 25 ms) during the detection. As shown in FIG. 1, coordinate values of a left-upper vertex of the display panel 110 are (0, 0) and coordinate values of a right-lower vertex are (799, 479).

In this example, the pixel number (height×width) of the LCD 111 is 480×800. The storage 120 is a memory area for storing an area management table 10 and a boundary line management table 20, in addition to programs for various applications (menu display application, mail application, document preparation application and the like) and data that the applications require.

The area management table 10 is a table for managing the respective display areas, and the boundary line management table 20 is a table for managing a boundary line dividing two display areas (refer to FIG. 8). The respective tables will be specifically described later. The control unit 130 has a function of determining the display areas and performing control on the image display for each of the display areas in accordance with the dividing operation and the combining operation of the user, in addition to the functions of the general portable phone.

The control unit 130 includes an area management unit 131, an application execution unit 132 and a display control unit 133. Here, the area management unit 131 has functions of detecting the dividing operation and the combining operation, based on the coordinate values output from the controller 113, defining the boundary line and the display areas in response to the detected operation and updating the area management table 10 and the boundary line management table 20 of the storage 120. A method of detecting the dividing operation and the combining operation will be described later.

When a normal operation other than the dividing operation and the combining operation, for example, an icon selection operation is detected, the area management unit 131 notifies the application execution unit 132 of the detection. The application execution unit 132 has a function of executing processing corresponding to a position on the display panel 110 (touch pad 112), which is indicated by the coordinate values output from the controller 113, based on the notification from the area management unit 131.

For example, as shown in FIG. 2A, in a case where the menu image having the icons A to I for activating the various applications is displayed on the display panel 110, when the user touches a finger and the like on the display position of the icon A, the application execution unit 132 activates an application (mail application, in this example) corresponding to the icon A. That is, the application execution unit 132 reads out and executes an application program corresponding to the icon A from the storage 120.

Also, the application execution unit 132 can execute a plurality of applications in parallel in a time division manner. As described above, when an activation operation of an application is made by the user, the application execution unit stores information (hereinafter, referred to as "correspondence information") indicative of a correspondence between the display area in which the activation operation has been made and the activated application, in the storage 120. For example, at the state shown in FIG. 2D, the correspondence information indicating that the display area A1 corresponds to the menu display application and the display area A2 corresponds to the mail application is stored in the storage 120.

Also, when the display areas are divided or combined, the application execution unit 132 performs processing of determining an image to be displayed in the display area after the division in accordance with an application corresponding to the display area before the division and in the display area after the combination in accordance with an application corresponding to the display area before the combination. The display control unit 133 displays an image corresponding to a processing result of the application execution unit 132 and the boundary line defined by the area management unit 131 on the LCD 111.

<4. Data>

Figures 8A, 8B:
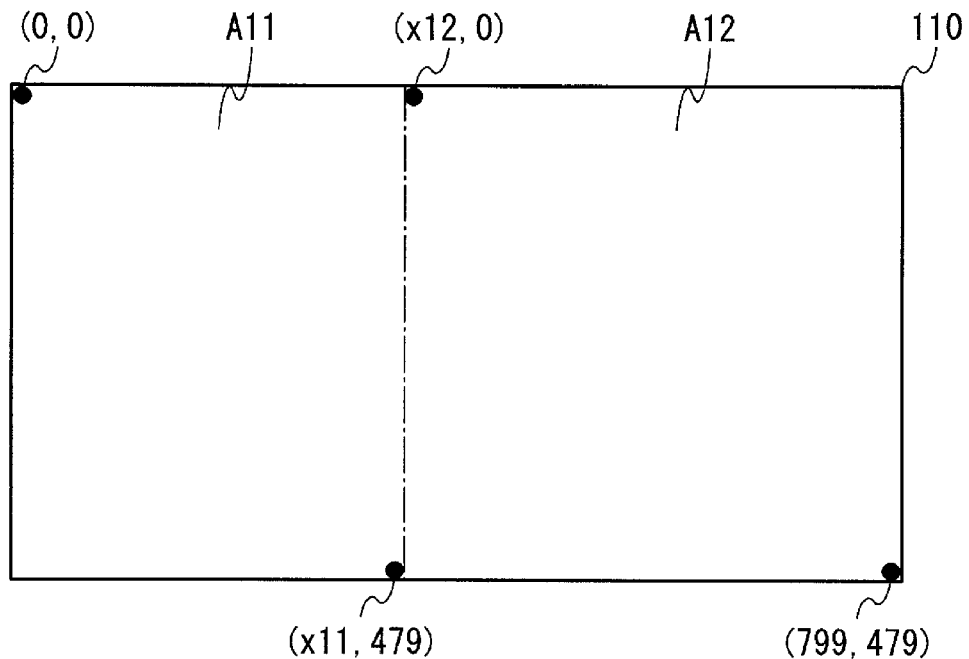
FIGS. 8A and 8B show a data configuration and a content example of an area management table 10, and an example of two display areas.
Figures 9A, 9B:
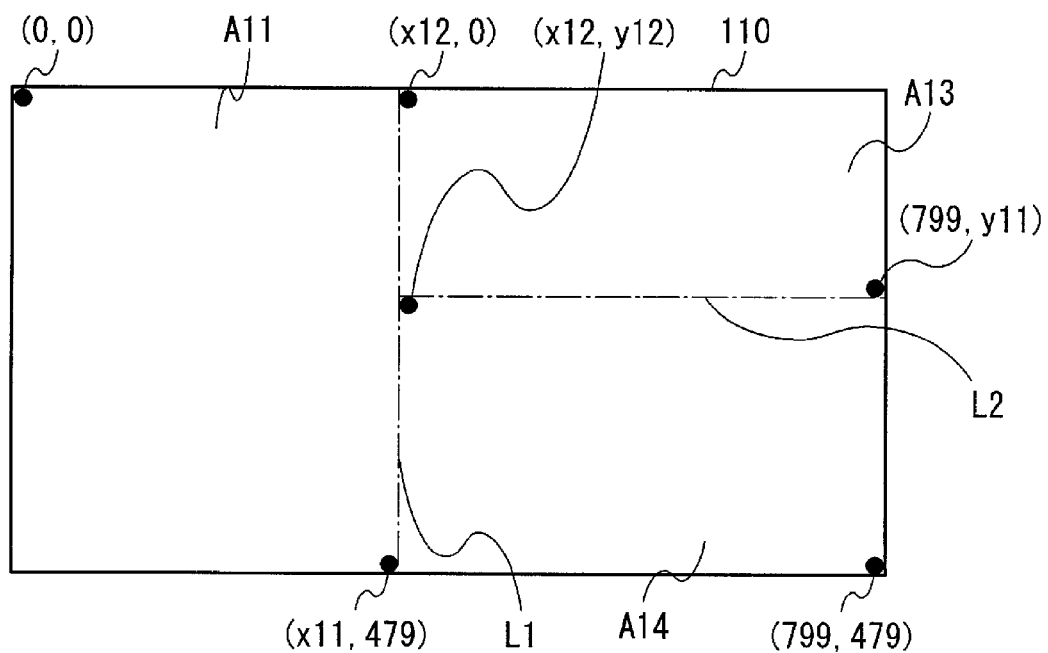
FIGS. 9A and 9B show a content example of the area management table 10 when three display areas are defined, and an example of three display areas.

In the below, data that the portable phone 100 uses is described with reference to FIGS. 8 to 10. In FIGS. 8B and 9B, only a screen example of the portable phone 100 is shown and the case 1 and the like of the portable phone 100 are omitted.

<4-1. Area Management Table>

First, the area management table 10 is described with reference to FIGS. 8A and 8B. FIGS. 8A and 8B show a data configuration and a content example of the area management table 10 and an example of two display areas. As shown in FIG. 8A, the area management table 10 is information in which an area ID 11, a left-upper coordinate value 12, a right-lower coordinate value 13 and a further divided area ID 14 are made to correspond to each other.

Meanwhile, x12 shown in FIGS. 8, 9 and 10 indicates a specific numerical value of 1 to 798, x11 indicates a value of x12-2, y12 indicates a specific numerical value of 1 to 478 and y11 indicates a value of y12-2. The information configured by an area ID, a left-upper coordinate value, a right-lower coordinate value and a further divided area ID is also referred to as "record." Here, the area ID 11 is identification information of a display area and different numbers of 1 or larger are used in this example.

The left-upper coordinate value 12 is a coordinate value of a left-upper vertex of a display area range (rectangular area) indicated by the corresponding area ID and the right-lower coordinate value 13 is a coordinate value of a right-lower vertex of the display area range. When the display area indicated by the corresponding area ID is further divided by any one boundary line, the further divided area ID 14 is an area ID of a display area after the further division. When the further divided area ID is set, it is shown that a display area indicated by the further divided area ID is determined, in place of a display area indicated by an area ID corresponding to the further divided area ID. That is, while the further divided area ID is set, a display area indicated by an area ID corresponding to the further divided area ID indicates an invalid area.

In the above drawings, "-" indicates that a display area indicated by the corresponding area ID is not further divided. For example, in FIG. 8A, the left-upper coordinate value of a display area having the area ID "1" is "(0,0)", the right-lower coordinate value is "(x11, 479)" and the further divided area ID is "-", i.e., the display area is not divided, so that the display area is valid.

Also, a display area having the area ID "1" shown in FIG. 8A corresponds to a display area A11 of FIG. 8B, and a display area having the area ID "2" shown in FIG. 8A corresponds to a display area A12 of FIG. 8B. In the below, it is described how the area management table 10 is updated when the display area A12 of FIG. 8B is further divided.

FIGS. 9A and 9B show a content example of the area management table 10 when three display areas are defined, and an example of three display areas. A display area having the area ID "3" shown in FIG. 9A corresponds to a display area A13 of FIG. 9B, and a display area having the area ID "4" shown in FIG. 9A corresponds to a display area A14 of FIG. 9B.

When the display area A12 shown in FIG. 8B is divided into the display areas A13, A14, as shown in FIG. 9B, the area management unit 131 updates the area management table 10 shown in FIG. 8A into the area management table 10 shown in FIG. 9A. That is, as shown in FIG. 9A, the area management unit registers a record 16 including an area ID "3" and a record 17 including an area ID "4" and updates the further divided area ID included in a record 18 having the area ID "2" from "-" to "3, 4".

Also, when the whole display surface or each display area of the display panel 110 is divided into two display areas, the area management unit 131 allots an area ID smaller than that of the other display area to one display area having a smaller y coordinate value of the left-upper vertex of the two display areas. Also, when the y coordinates values of the left-upper vertices of the two display areas are the same, the area management unit allots an area ID smaller than that of the other display area to one display area having a smaller x coordinate value of the left-upper vertex.

In the area management table 10 of FIG. 9A updated as described above, the display area A11 having an area ID "1" is valid, and the display areas A13, A14 having area IDs "3" and "4" are valid, in place of the display area A12 having an area ID "2". Here, it is described that the display area is divided. However, when the display areas A13, A14 having the area IDs "3" and "4" are combined at the state shown in FIG. 9B, the area management table 10 is updated from the state shown in FIG. 9A to the state shown in FIG. 8A.

<4-2. Boundary Line Management Table>

In the below, the boundary line management table 20 is described with reference to FIG. 10. FIG. 10 shows a data configuration and a content example of the boundary line management table 20. Also, FIG. 10 shows a content example of the boundary line management table when three display areas shown in FIG. 9B are defined.

As shown in FIG. 10, the boundary line management table 20 includes information in which a boundary line ID 21, a first coordinate value 22, a second coordinate value 23 and a divided area ID 24 are made to correspond to each other. Meanwhile, the information configured by a boundary line ID, a first coordinate value, a second coordinate value and a divided area ID is also referred to as "record." Here, the boundary line ID 21 is identification information of the boundary line and different numbers of 1 or larger are used in this example.

The first coordinate value 22 and the second coordinate value 23 are coordinate values of different end points of both end points of a boundary line indicated by the corresponding boundary line ID. The divided area ID 24 is an area ID of each display area divided by a boundary line indicated by the corresponding boundary line ID and is the same as one area ID of the area management table 10. For example, in FIG. 10, the first coordinate value of the boundary line having the boundary line ID "2" is "(x12, y12-1)", the second coordinate value is "(799, y12-1)" and the divided area ID is "3, 4", which shows that the display areas divided by the boundary line are areas (A13, A14 in FIG. 9A) having the area IDs "3" and "4".

Meanwhile, the boundary line having the boundary line ID "1" shown in FIG. 10 corresponds to the boundary line L1 of FIG. 9B and the boundary line having the boundary line ID "2" shown in FIG. 10 corresponds to the boundary line L2 of FIG. 9B. Also, here, the boundary line management table 20 is described when the three display areas shown in FIG. 9B are defined. However, when the display areas A13, A14 are combined at the state shown in FIG. 9B, the record 26 about the boundary line (L2 in this example) dividing the combined display areas A13, A14 is deleted. Also, when the division is newly made, a record about a boundary line dividing respective display areas after the division is added.

<5. Detection of Dividing Operation and Combining Operation>

Figure 11:
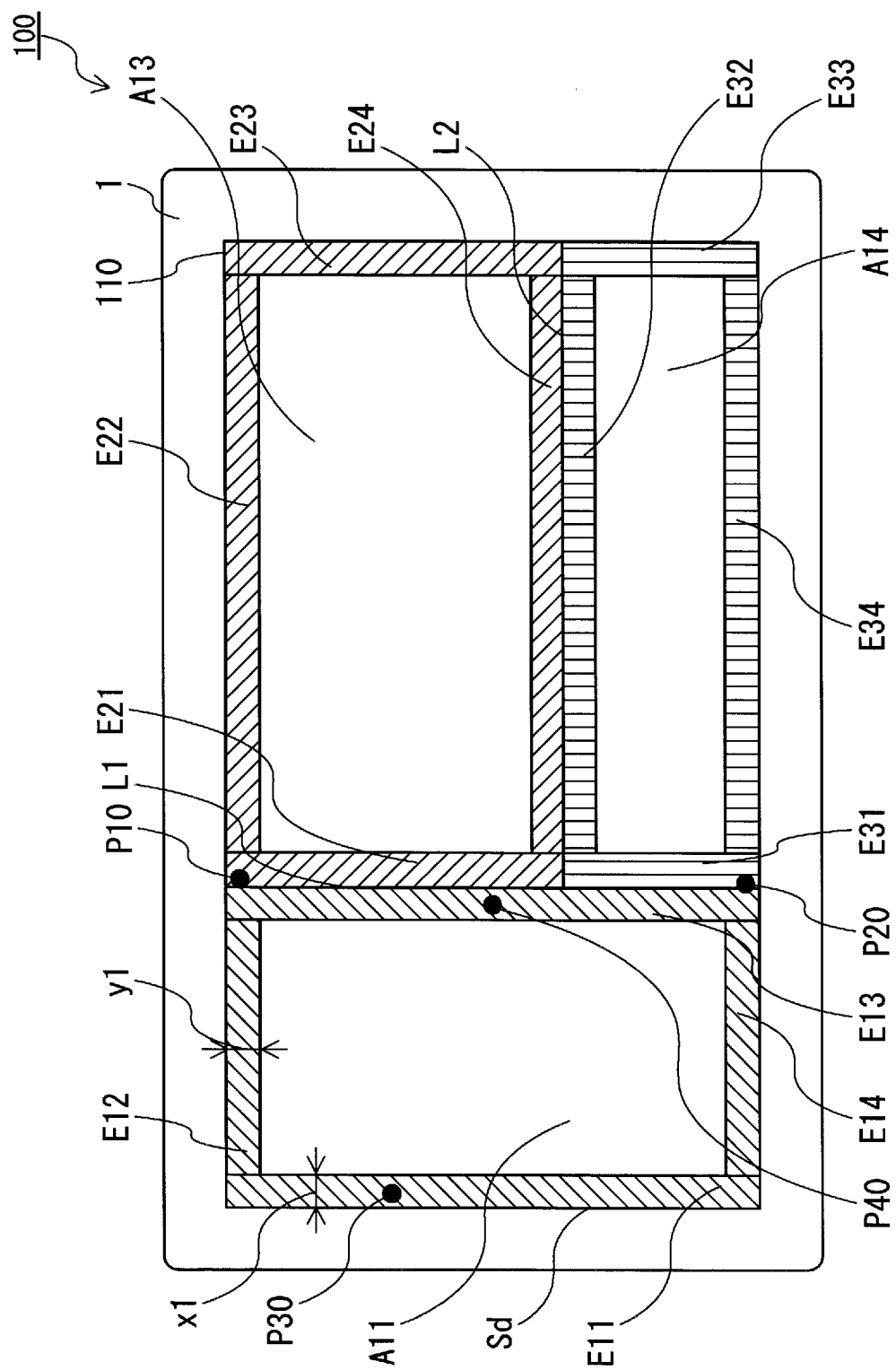
FIG. 11 shows respective edge portions of respective display areas.

In the below, it is described how the area management unit 131 detects the dividing operation and the combining operation, with reference to FIG. 11. FIG. 11 shows respective edge portions of respective display areas. Four edge portions to be inscribed are defined for each display area. Hatched portions in FIG. 11 indicate edge portions E11 to E14 of the display area A11, edge portions E21 to E24 of the display area A12 and edge portions E31 to E34 of the display area A14.

A width of each edge portion E11, E13, E21, E23, E31, E33 is x1 and a width of each edge portion E12, E14, E22, E24, E32, E34 is y1. In the meantime, x1 and y1 shown in FIG. 11 are numerical values which are predetermined so as to define widths of the edge portions, and "10" for example. However, the other numerical values may be used and x1 and y1 may have different values.

The area management unit 131 detects, as the dividing operation, an operation having any one edge portion as a starting position of a touch and the other edge portion facing to the one edge portion as an ending position of the touch. For example, when a touch starts from the edge portion E11 and separates at the edge portion E13 facing the edge portion E11, the corresponding operation is detected as the dividing operation and the display area A11 is divided into two display areas.

Also, for example, when a touch starts from the edge portion E11 and separates at a position of the edge portion E23 facing the edge portion E11, which position is included in the display area A13, for example, the corresponding operation is detected as the dividing operation and the display areas A11, A13 are respectively divided into two display areas. Also, the area management unit 131 detects, as the combining operation, an operation having a position within a predetermined range from one end point of any one boundary line, which is a starting position of a touch, and a position within a predetermined range from the other end point of the boundary line, which is an ending position of the touch. For example, when a touch starts from a position P10 and separates at a position P20, the corresponding operation is detected as the combining operation.

In the meantime, the predetermined range for detecting the combining operation is a range from one end point to x1 and y1. That is, like the dividing operation, the starting position and ending position of the touch in the combining operation are any one edge portion.

<6. Operations>

In the below, operations of the portable phone 100 having the above configuration are described with reference to FIGS. 12 to 14.

<6-1. Control Processing>

First, control processing of the portable phone 100 is described. FIG. 12 is a flow chart showing control processing of the portable phone 100. The control processing shown in FIG. 12 starts when a power supply of the portable phone 100 turns on and ends when the power supply turns off, although not specifically shown. It is noted that when the power supply of the portable phone 100 turns on, the control unit 130 initializes the area management table 10 and the boundary line management table 20 of the storage 120, i.e., deletes all records registered.

The area management unit 131 of the control unit 130 determines whether a user has started a touch with a finger and the like, based on whether the coordinate values are output from the controller 113 (step S1). When the coordinate values are not output from the controller 113, the area management unit 131 determines that a user has not started a touch with a finger and the like (step S1: NO) and again performs the processing of step S1.

When the coordinate values are output from the controller 113, the area management unit 131 determines that a user has started a touch with a finger and the like (step S1: YES) and determines whether a starting position Pa of the touch by the user's finger and the like, which is indicated by the coordinate values output from the controller 113, is included in any one edge portion (step S2). That is, the area management unit 131 specifies positions of the four inscribed edge portions for each display area indicated by the area management table 10 stored in the storage 120 and determines whether the starting position Pa of the touch by the user's finger and the like is included in any one specified edge portion.

When the starting position Pa of the touch by the user's finger and the like is not included in any edge portion (step S2: NO), the area management unit 131 determines whether the user continues the touch with a finger and the like, based on whether the coordinate values are newly output from the controller 113 (step S3). While the coordinate values are newly output from the controller 113, the area management unit 131 determines that the user continues the touch with a finger and the like (step S3: YES) and repeats the processing of step S3.

When the coordinate values are not newly output from the controller 113, the area management unit 131 determines that the user has not performed the touch any more with a finger and the like (step S3: NO) and notifies the application execution unit 132 of the determination. The application execution unit 132 having received the notification executes processing corresponding to an ending position (last touch position) of the touch (step S4) and the area management unit 131 again executes the processing from step S1.

On the other hand, when it is determined in step S2 that the starting position Pa of the touch by the user's finger and the like is included in any edge portion (step S2: YES), the area management unit 131 determines whether the touch position has moved, based on the touch position indicated by the coordinate values newly output from the controller 113 (step S5). When the touch position has moved (step S5: YES), the area management unit 131 specifies an intersection point passing the starting position Pa between a normal line to a side and the like of the edge portion including the starting position Pa and the side and the like and a position of the touch position in the normal line direction after the move. The area management unit 131 instructs the display control unit 133 to display the normal line from the specified intersection point to the position in the normal line direction. The display control unit 133 having received the instruction displays the normal line (step S6).

Here, the side and the like of the edge portion including the starting position Pa refers to the side Sa to Sd (refer to FIG. 1) of the display panel 110 or boundary line. For example, when the starting position Pa is a position P30 of FIG. 11, the side and the like of the edge portion including the starting position Pa is the side Sd of the display panel 110. Also, for example, when the starting position Pa is a position P40 of FIG. 11, the side and the like of the edge portion including the starting position Pa is the boundary line L1.

For example, when the starting position Pa is a position P30 of FIG. 11, the normal line L30 is displayed, as shown in FIG. 4B. When completing the processing of step S6, the area management unit 131 again executes the processing from step S5. When the touch position has not moved (step S5: NO), the area management unit 131 determines whether the user has touched with a finger and the like (step S7), like step S3.

When the user has touched with a finger and the like (step S7: YES), the area management unit 131 again executes the processing from step S5. When the user has not touched with a finger and the like (step S7: NO), the area management unit determines whether an ending point Pb of the touch is included in the edge portion facing the edge portion including the starting position Pa of the touch (step S8), like step S2. When the ending point Pb of the touch is not included in the edge portion facing the edge portion including the starting position Pa of the touch (step S8: NO), the area management unit 131 does not particularly perform any processing and again executes the processing from step S1.

When the ending point Pb of the touch is included in the edge facing the edge portion including the starting position Pa of the touch (step S8: YES), the area management unit 131 determines whether the starting position Pa and the ending position Pb are within a predetermined range from the respective end points of any one boundary line (step S9). When the starting position Pa and the ending position Pb are not within a predetermined range from the respective end points of any one boundary line (step S9: NO), the area management unit 131 determines that the operation relating to the touch starting at step S1 and ending at step S7 is the dividing operation, and performs dividing processing (step S10).

On the other hand, when the starting position Pa and the ending position Pb are within a predetermined range from the respective end points of any one boundary line (step S9: YES), the area management unit 131 determines that the operation relating to the touch starting at step S1 and ending at step S7 is the combining operation, and performs combining processing (step S20). When completing the processing of step S10 or S20, the area management unit 131 again executes the processing from step S1.

<6-2. Dividing Processing>

Subsequently, the dividing processing of step S10 is specifically described. FIG. 13 is a flow chart showing the dividing processing of the portable phone 100. The area management unit 131 determines whether the ending point Pb of the touch is the facing edge portion of the same display area as the edge portion of the starting position Pa of the touch or the facing edge portion of the other display area (step S11).

This corresponds to the determination of determining whether the dividing operation relating to the touch starting at step S1 and ending at step S7 is the dividing operation of dividing one display area into two display areas, as shown in FIG. 3, for example, or the dividing operation of dividing each of two display areas into two display areas, as shown in FIG. 5, for example. When the ending position Pb of the touch is the facing edge portion of the same display area as the edge portion of the starting position Pa of the touch (step S11: same area), the area management unit 131 determines a new boundary line and two display areas (hereinafter, referred to as "divided areas"), based on the starting position Pa and the ending position Pb of the touch (step S12). Meanwhile, the two divided areas are an example of the first and second display areas.

Figure 12:
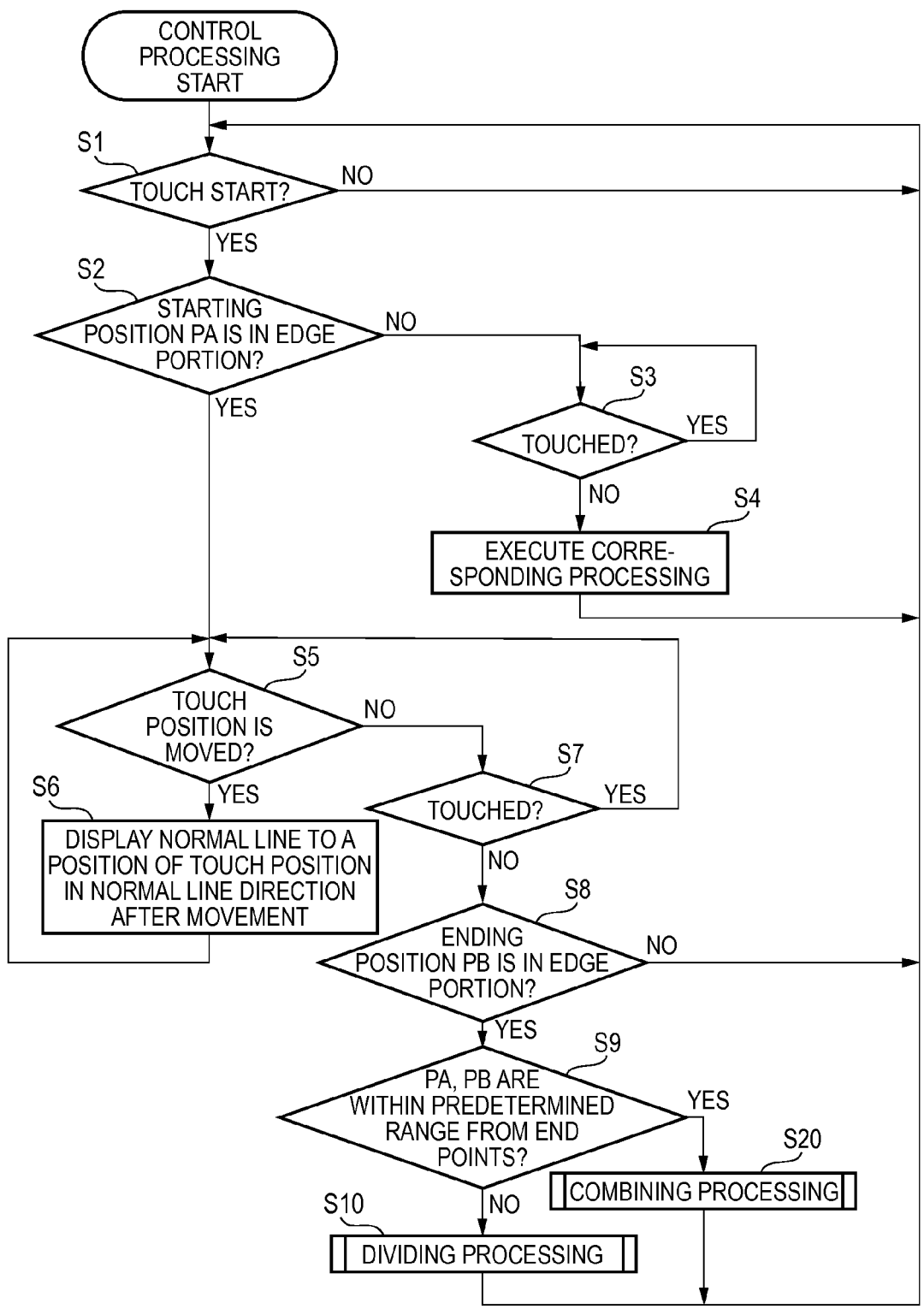
FIG. 12 is a flow chart showing control processing of the portable phone 100.
Figure 13:
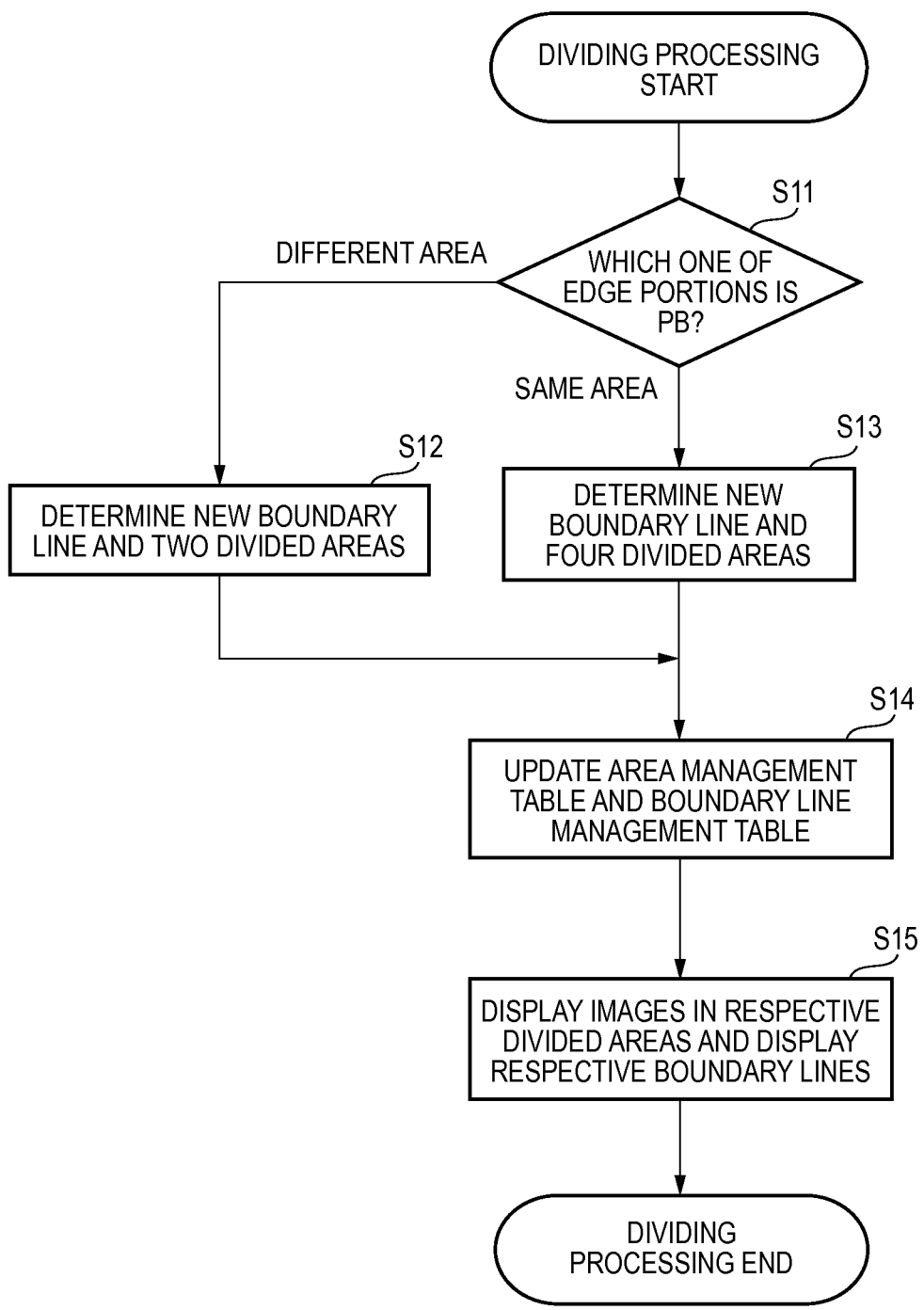
FIG. 13 is a flow chart showing dividing processing of the portable phone 100.

Specifically, the area management unit 131 determines, as a new boundary line, a boundary line having the one end point of the normal line of step S6 of FIG. 12 as the intersection point Pc of step S6 and the other end point of the normal line as an intersection point Pd between the side and like of the edge portion including the ending point Pb of the touch and the normal line. Also, the area management unit determines the display areas including the starting position Pa of the touch and the ending position Pb of the touch as two display areas formed by the determined new boundary line.

On the other hand, when it is determined in step S11 that the ending position Pb of the touch is the facing edge portion of the display area different from the edge portion of the starting position Pa of the touch (step S11: different area), the area management unit 131 determines a new boundary line and four divided areas (step S13). Meanwhile, the four divided areas are an example of the first, second, third and fourth display areas. The method of determining the new boundary line is the same as the step S12. Also, the area management unit determines two display areas formed by the determined new boundary line, for each of the display area including the starting position Pa of the touch and the display area including the ending position Pb of the touch.

When completing the processing of step S12 or S13, the area management unit 131 updates the area management table 10 and the boundary line management table 20 of the storage 120 so as to reflect the information about the determined new boundary line and the determined display areas (step S14). Meanwhile, in the processing of step S14 after completing the processing of step S12, the area management table 10 and the boundary line management table 20 are updated as described above with reference to FIGS. 8 to 10.

Also, in the processing of step S14 after completing the processing of step S13, the area management table 10 and the boundary line management table 20 are updated as described below with reference to FIG. 15. FIGS. 15A to 15C show content examples of the area management table 10 and the boundary line management table 20 when four display areas are defined, and an example of four display areas.

Figures 15A, 15B, 15C:
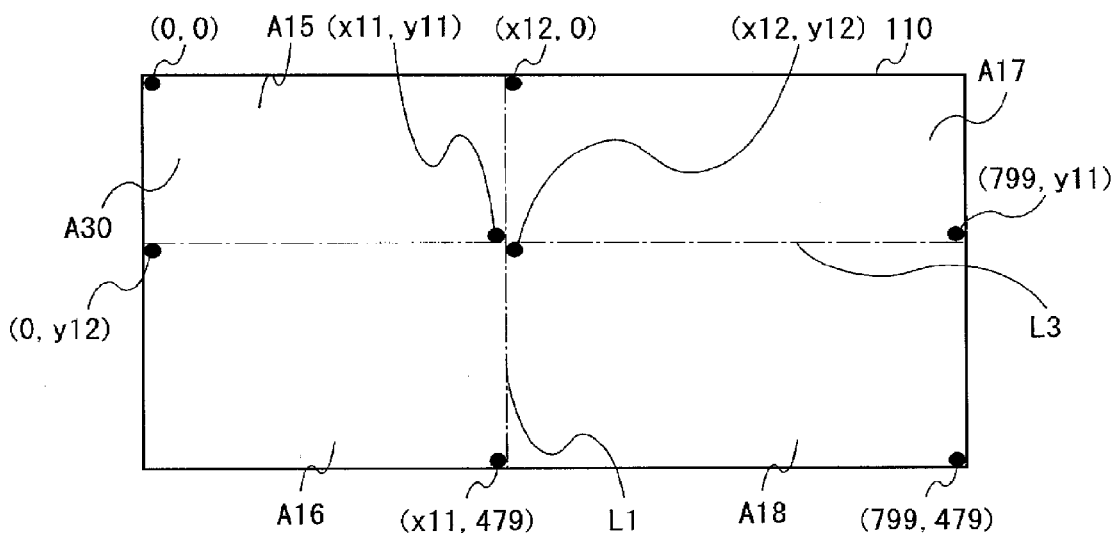
FIGS. 15A to 15C show content examples of the area management table 10, the boundary line management table 20 when four display areas are defined, and an example of four display areas.

In this example, the new boundary line determined in step S13 is regarded as a boundary line L3 shown in FIG. 15C. By the new boundary line L3, the display area A11 having the area ID "1" (refer to FIG. 8) is divided into two display areas A15, A16 of FIG. 15C and the display area A12 having the area ID "2" (refer to FIG. 8) is divided into two display areas A17, A18 of FIG. 15C.

Therefore, as shown in FIG. 15A, the area management unit 131 registers four records 19a about the display areas A15 to A18 with the area management table 10. Also, the area management table 131 updates the further divided area ID of the record for the display area A11 having the area ID "1" in the area management table 10 into the area IDs "3, 4" of the display areas A15, A16 (refer to a reference numeral 19b). Also, the area management unit 131 updates the further divided area ID of the record for the display area A12 having the area ID "2" in the area management table 10 into the area IDs "5, 6" of the display areas A17, A18 (refer to a reference numeral 19c).

Also, as shown in FIG. 15B, the area management unit 131 registers a record 27 for the new boundary line L3, in which the area IDs "3, 4, 5, 6" of the display areas A15 to A18 are set in the divided area ID, with the boundary line management table 20. When the processing of step S14 has completed, the application execution unit 132 refers to the correspondence information of the storage 120 and determines images which should be displayed in the respective divided areas determined in the processing of step S12 or S13, based on an application corresponding to the display area before the division.

The display control unit 133 displays the images, which are determined by the application execution unit 132, in the respective divided areas of the display panel 110, displays the boundary line, which is determined in the processing of step S12 or S13, on the display panel 110 (step S15) and then terminates the dividing processing.

<6-3. Combining Processing>

In the below, the combining processing of step S20 is specifically described.

Figure 14:
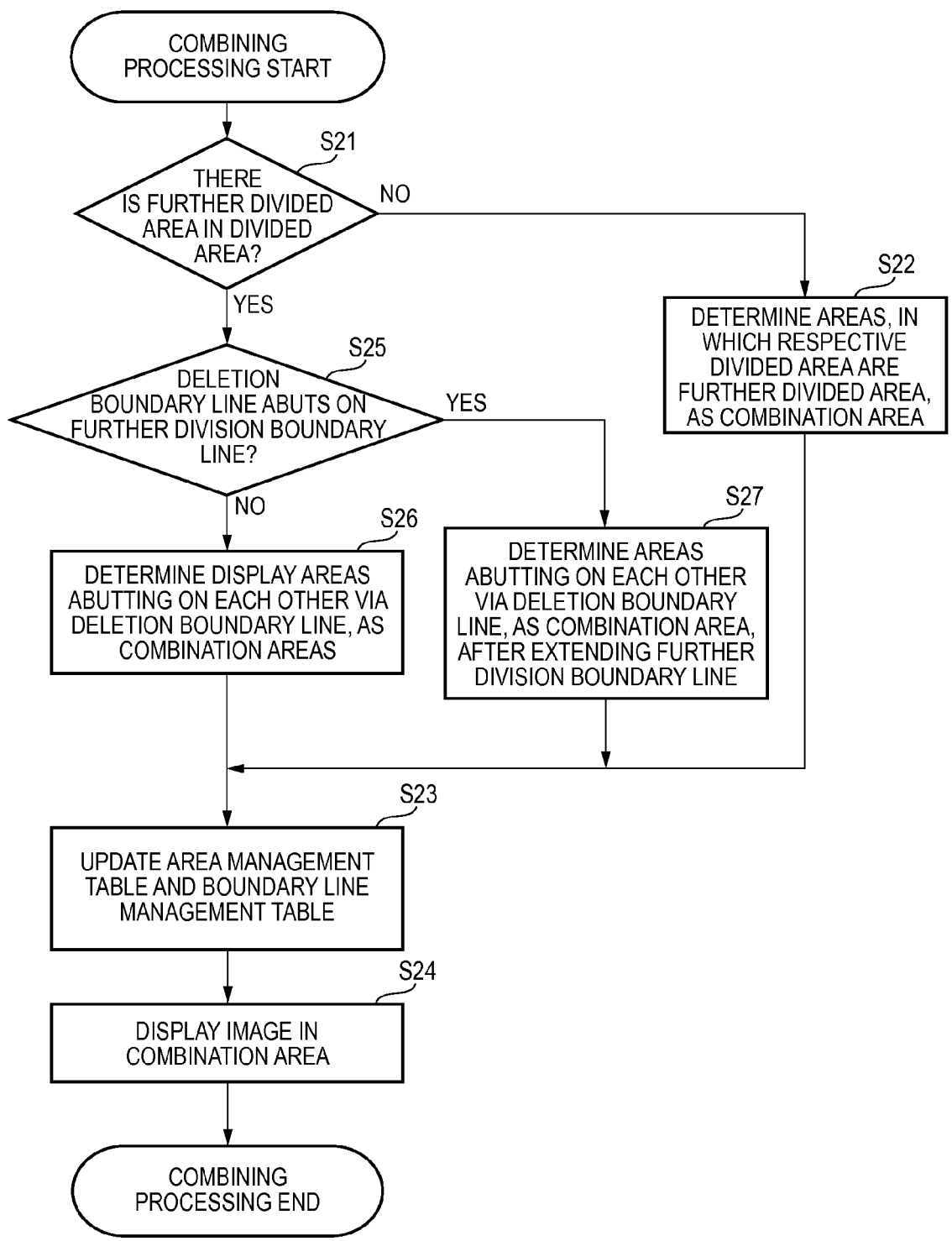
FIG. 14 is a flow chart showing combining processing of the portable phone 100.

FIG. 14 is a flow chart showing the combining processing of the portable phone 100. In step S9 of FIG. 12, the area management unit 131 determines whether there is a display area (hereinafter, referred to as "further divided area"), which is formed by further dividing any one divided area, in the any one of the two divided areas divided by the boundary line (hereinafter, referred to as "deletion boundary line") for which it is determined in step S19 that the starting position Pa and the ending position Pb are within a predetermined range from the respective end points (step S21).

Specifically, the area management unit 131 acquires the divided area ID, which is included in the record for the deletion boundary line, from the boundary line management table 20 and specifies the respective records including the same area ID as the acquired divided area ID in the area management table 10. Also, when the further divided area ID is set in any one of the respective specified records, the area management unit 131 determines that there is a further divided area in the divided area (step S21: YES). Also, when the further divided area ID is not set in any one of the respective specified records, the area management unit 131 determines that there is no further divided area in the divided area (step S21: NO).

When it is determined that there is no further divided area in the divided area (step S21: NO), the area management unit 131 determines the areas, in which the respective divided areas are considered as the further divided areas, as a display area (hereinafter, referred to as 'combination area") after combination (step S22). Specifically, the area management unit 131 specifies the area IDs included in the record, which includes the divided area IDs, which are acquired in step S21 and included in the record for the deletion boundary line, in the further divided area ID, from the area management table 10. The area management unit 131 determines, as the combination area, the display areas indicated by the specified area IDs.

In the example of FIGS. 15A to 15C, when the deletion boundary line is L3, four area IDs are registered in the divided area ID of the record 27 for the deletion boundary line L3 shown in FIG. 15B. In this case, the area management unit 131 specifies a plurality of records, which includes, in the further divided area ID, the sets ("3, 4" and "5, 6" in this example) having four different area IDs included in the divided area ID, i.e., a plurality of records having the area IDs "1" and "2" from the area management table 10. The area management unit 131 determines, as the combination area, the respective display areas A11, A12 (refer to FIG. 8) indicated by the respective specified area IDs "1" and "2".

Also, the area management unit 131 updates the area management table 10 and the boundary line management table 20 of the storage 120 (step S23). Specifically, the area management unit 131 deletes the record for the deletion boundary line from the boundary line management table 20 and deletes the records for the respective divided areas from the area management table 10. Also, the area management unit 131 updates the further divided area ID of the record of the area management table 10 including the area IDs of the combination area determined in step S22 into "-".

When completing the processing of step S23, the application execution unit 132 determines an image displayed in any one area of the areas configuring the combination area, as an image which should be displayed in the combination area determined in the processing of step S22. For example, the application execution unit 132 determines an image which is displayed in the display area having the minimum area ID of the areas configuring the combination area, as an image which should be displayed in the combination area.

Also, the display control unit 133 displays the determined image in the combination area of the display panel 110 (step S24) and terminates the combining processing. Also, the display of the deletion boundary line is deleted. On the other hand, when it is determined in step S21 that the further divided areas exist in the divided area (step S21: YES), the area management unit 131 determines whether a boundary line dividing the further divided areas (hereinafter, referred to as "further division boundary line") abuts on the deletion boundary line (step S25).

The configuration that the further division boundary line abuts on the deletion boundary line means that one end point on one of the further division boundary line and the deletion boundary line is a point on the other boundary line. When the further division boundary line does not abut on the deletion boundary line (step S25: NO), i.e., when the further division boundary line is parallel with the deletion boundary line or the further division boundary line and the deletion boundary line intersect with each other, the area management unit 131 determines two display areas, which abut on each other via the deletion boundary line, as the combination area (step S26).

For example, in FIGS. 15A to 15C, when the deletion boundary line is L1, the respective further divided areas A15, A16 having the area IDs "3" and "4" exist in the divided area A11 (refer to FIG. 8B) having the area ID "1" and the respective further divided areas A17, A18 having the area IDs "5" and "6" exist in the divided area A12 (refer to FIG. 8B) having the area ID "2". The further division boundary line L3 having the boundary line ID "2", which divides the respective further divided areas A15 to A18 intersects with the deletion boundary line L1.

Accordingly, the area management unit 131 determines an area including the two display areas A15 and A17 abutting on each other via the deletion boundary line L1 and an area including the two display areas A16 and A18, as the combination area. When completing the processing of step S26, the area management unit 131 performs the processing of step S23.

That is, the area management unit 131 deletes the record for the deletion boundary line from the boundary line management table 20 and deletes the records for the respective divided areas from the area management table 10. Also, the area management table 131 adds a record for the combination area determined in step S26 to the boundary line management table 20 and sets the area IDs included in the added record in the divided area ID included in the record of the boundary line management table 20 for the further division boundary line. Also, the area management unit 131 deletes the record of the area management table 10 including the area ID not registered in the divided area ID 24 of the boundary line management table 20.

When completing the processing of step S23, the application execution unit 132 determines an image which should be displayed in the combination area determined in the processing of step S22, and the display control unit 133 displays the determined image in the combination area of the display panel 110 (step S24), as described above, and terminates the combining processing. On the other hand, when it is determined in step S25 that the further division boundary line abuts on the deletion boundary line (step S25: YES), the area management unit 131 extends the further division boundary line to the other divided area and then determines the two display areas abutting on each other via the deletion boundary line, as the combination area (step S27).

For example, in FIGS. 9A and 9B, when the deletion boundary line is L1, the respective further divided areas A13, A14 having the area IDs "3" and "4" exist in the divided area A12 (refer to FIG. 8B) having the area ID "2". The further division boundary line L2 having the boundary line ID "2", which divides the respective further divided areas A13, A14, abuts on the deletion boundary line L1.

Accordingly, the area management unit 131 extends the further division boundary line L2 to the other divided area A11 having the area ID "1" and then determines an area including two display areas abutting on each other via the deletion boundary line L1, i.e., an area having the left-upper coordinate value "(0, 0)" and the right-lower coordinate value "(x11, y11)" and the display area A13, as the combination area. Further, the area management unit 131 determines an area including an area having the left-upper coordinate value "(0, y12)" and the right-lower coordinate value "(x11, 479)" and the display area A14, as the combination area.

When completing the processing of step S27, the area management unit 131 performs the processing of step S23. That is, the area management unit 131 deletes the record for the deletion boundary line from the boundary line management table 20 and adds the record for the combination area determined in step S27 to the area management table 10. Also, the area management table 131 sets the area ID included in the added record in the divided area ID included in the record of the boundary line management table 20 for the re-division boundary line and updates the first coordinate value and the second coordinate value of the corresponding record so that they indicate the further division boundary line after the extension. Also, the area management unit 131 deletes the record of the area management table 10 including the area IDs not registered in the divided area ID 24 of the boundary line management table 20.

When completing the processing of step S23, the application execution unit 132 determines an image which should be displayed in the combination area determined in the processing of step S22, and the display control unit 133 displays the determined image in the combination area of the display panel 110 (step S24), as described above, and terminates the combining processing.

Other Illustrative Embodiments

Although a portable terminal according to an illustrative embodiment of the invention has been described, following modifications can be also made. It should be noted that the present invention is not limited to the portable phone described in the above illustrative embodiment.

(1) In the above illustrative embodiment, when the ending position Pb of the touch is included in the edge portion facing the edge portion including the starting position Pa of the touch, it is determined that the dividing operation or combining operation has been made. However, a mode of performing the dividing operation and the combining operation and a mode of performing a normal operation except for the operations may be switched by a predetermined operation. And, when a predetermined operation is performed in the mode of performing the dividing operation and the combining operation, it may be determined that the dividing operation or combining operation has been made.

The predetermined operation may be an operation other than the drag operation described in the illustrative embodiment. For example, in a case where there are two display areas, when a touch operation is performed on the one display area by a finger and the like, it may be determined that the dividing operation has been made. In this case, it may be possible to divide the one display area by a normal line to a boundary line of the two display areas, which passes the touch position. Also, when a finger and the like are touched on a position within a predetermined range from a position on the boundary line, it may be determined that the combining operation has been made.

(2) In the above illustrative embodiment, when the ending position Pb of the touch is included in the edge portion facing the edge portion including the starting position Pa of the touch, it is determined that the dividing operation or combining operation has been made. However, in a case where two display areas exist, when a drag operation is made, a distance from the starting position Pa of the drag operation to the ending position Pb in a normal line direction to a boundary line of the two display areas may be calculated and it may be determined that the combining operation has been made when the calculated distance is a first distance or larger.

Also, in the above illustrative embodiment, it is determined whether one display area is divided into two or each of the two display areas is divided into two, depending on whether the edge portion including the starting position Pa and the edge portion including the ending position Pb are the edge portions of the same display area. However, in a case where two display areas exist and a drag operation is made, when the distance from the starting position Pa of the drag operation to the ending position Pb, which is calculated as described above, is the first distance or larger and is smaller than a second distance longer than the first distance, it may be determined that one display area is divided into two and when the distance is the second distance or larger, it may be determined that each of the two display areas is divided into two.

Here, the first distance and the second distance may be determined based on a line length in the normal line direction on the display area to be divided, for example. Also, an operation mode for dividing one display area into two and an operation mode for dividing each of two display areas into two may be switched by a predetermined operation, and it may be determined whether one display area is divided into two or each of the two display areas is divided into two, depending on the currently set mode.

(3) In the above illustrative embodiment, the boundary line is a normal line. However, the boundary line may be an oblique line or curved line.

(4) In the above illustrative embodiment, when combining two display areas, the image which is displayed in the display area of the two display areas indicated by the smaller area ID is displayed in a display area after the combination. However, an image which is displayed in the display of the two display areas in which the user has lately made an operation may be displayed in a display area after the combination.

(5) In the above illustrative embodiment, the line having a length corresponding to the current touch position is displayed during the dividing operation and the combining operation and the boundary line is displayed after the dividing operation. However, the lines may not be displayed.

(6) In the above illustrative embodiment, like the example of the display areas A5 and A6 of FIG. 4C, in a case where the parts of the image of the one document file are displayed in the respective display areas, when the editing is made in either one display area, the editing content is also reflected in the other display area. However, it may be possible that even when the editing is made in either one display area, the editing content is not reflected in the other display area. In this case, for example, the document relating to each display area may be stored in the other file by a user operation or automatically. Also, although the document file has been exemplified, the above modification can be also applied to data having content which can be changed. That is, when parts of an image of the data having content which can be changed are displayed in the respective display areas, it may be possible that even when a change is made in any one display area, the editing content is not reflected in the other display area.

(7) In the above illustrative embodiment, the display surface of the display panel 110 is divided into three or four display areas. However, the number of the display areas is not limited thereto. That is, the display surface may be divided into five or more according to the dividing operation.

However, when the number of the display areas is too large, a size of each display area is smaller and the visibility is generally lowered. Hence, in a predetermined condition, the display surface may not be divided even though the dividing operation is made. The predetermined condition may include conditions on the number of times of division, the number of display areas and a size of a display area obtained by the division. For example, when the number of times of division or the number of display areas is smaller than a number preset by a manufacturer or a number based on a setting by a user, the division may be enabled. Also, for example, the division may be enabled when a size of a display area obtained by the division is equal to or larger than a size preset by a manufacture or size based on a setting by a user. In this case, the processing of step S13 of FIG. 13 is necessarily changed to divide all display areas to which the boundary line passes.

(8) The portable phone 100 of the above illustrative embodiment may be configured to replace and display the images which are displayed in the two display areas, based on a predetermined touch operation. The predetermined touch operation may include a drag operation having a shorter distance than the dividing operation and the combining operation, in which positions on the two display areas for which the display images are replaced are the starting position and ending position of the touch.

Specifically, for example, in a case where the two display areas for which the display images are replaced are two adjacent display areas, when a drag operation is made in which a position on one edge portion of two edge portions, which are adjacent via a boundary line dividing the two display areas, is made as a starting position and a position on the other edge portion is made as an ending position, the display images can be replaced. Also, a mode of performing an operation of replacing the display images in the two display areas may be provided. Then, the display images may be replaced when a specific touch operation of designating two display areas (for example, an operation of sequentially touching a finger and the like at positions on the two display areas) is performed in the mode.

Also, for example, an operation mode of moving a position of the boundary line may be provided. When a predetermined operation, for example, a drag operation is made in which a position within a predetermined range from a position on the boundary line is a starting position and which is performed in a substantial normal line direction to the boundary line, in the operation mode, the position of the boundary line may be moved. Meanwhile, in a case where the further divided areas exist in the two division areas which are divided by the boundary line to be moved, when the boundary line to be moved abuts on the further division boundary line, it is necessary to adjust (extend or shorten) a length of the further division boundary line so that it continues to abut on the boundary line after the moving. For example, when the boundary line L11 is moved rightward at the state of FIG. 3B, the length of the boundary line L21 is shortened, and when the boundary line L11 is moved leftward, the length of the boundary line L21 is extended.

(9) As shown in FIG. 1, the portable phone 100 of the above illustrative embodiment is a straight-type terminal. However, a portable phone having another outer appearance such as slide-type or folding-type portable phone may be also used. Also, in the above illustrative embodiment, the shape of the LCD 111 is substantially rectangular. However, the shape may be circular or other polygonal, for example. Also, in the above illustrative embodiment, the pixel number (height× width) of the LCD 111 is 480×800 pixels. However, the pixel number is not limited thereto and the other pixel number may be appropriately used. In this case, the touch pad 112 may be also adapted to output the coordinate values matched with the pixel number of the LCD 111. Also, the display panel 110 includes the LCD 111. However, the display panel may also include an organic EL (Electro-Luminescence) and the like.

(10) The touch pad 112 of the above illustrative embodiment is realized by the electrostatic capacitance touch sensor. However, regarding the electrostatic capacitance touch sensor, it may be possible to use an appropriate sensor such as a projective type in which a plurality of electrode patterns is formed on a substrate such as plastic and glass and a ratio of current amounts by the electrode patterns adjacent to a touch point is measured to determine the touch point and a surface type in which a conductive film and a substrate are provided, electrodes are provided at corners of the substrate, a uniform electric field is formed by the conductive film and a ratio of current amounts of the electrodes at the corners by a touch of a finger and the like is measured to determine the touch position. Also, the touch pad 112 is not limited to the electrostatic capacitance touch sensor. For example, it may be possible to use an appropriate sensor such as an electromagnetic induction type using a dedicated pen such as electronic pen, a matrix switching type consisting of a transparent electrode of a two-layered structure, a resistance film type in which a voltage is applied to one of two resistance films and a voltage corresponding to an operation position on the other resistance film is detected, a surface elastic wave type in which a rebounding of a vibrational wave is detected by a voltage change of a piezoelectric device and a touch of a finger and the like is detected, an infrared type in which a touch position of a finger and the like is detected by shielded infrared and an optical sensor type in which a touch position is detected by an optical sensor embedded in a screen.

(11) The whole or parts of the respective constitutional elements described in the above illustrative embodiment can be implemented by one chip or an integrated circuit of a plurality of chips, by a computer program and by the other forms. Also, the respective constitutional elements described in the above illustrative embodiment cooperate with a processor of the portable phone, thereby implementing the functions.

(12) A program for enabling a processor to execute the control processing (refer to FIGS. 12 to 14) of the portable phone described in the above illustrative embodiment may be recorded in a recording medium or may be circulated and distributed via a variety of communication routes. The recording medium includes an IC card, a hard disk, an optical disk, a flexible disk, a ROM, a flash memory and the like. The circulated and distributed program is stored and used in a memory and the like which can be read by a processor of a device. The processor executes the program, such that the respective functions of the portable phone described in the above illustrative embodiment are realized.

(13) The modifications of the part or whole of the above (1) to (12) can be combined and applied to the portable phone of the above illustrative embodiment.

(14) In the below, configurations of the portable terminal according to an illustrative embodiment and modified illustrative embodiments thereof and effects are described.

(a) A portable terminal according to an illustrative embodiment of the present invention includes: a display panel including a display surface having a touch pad; an area management unit which defines a plurality of display areas formed by dividing the display surface in response to a touch operation on the touch pad; and a display control unit which performs control on an image display in each of the display areas formed by dividing the display surface, wherein in a state where two display areas are defined by dividing the display surface with a first boundary line, in response to a touch operation on the touch pad, the area management unit determines, based on a touch position of the touch operation, a second boundary line passing one point on the first boundary line and one point within a predetermined range from the touch position and defines two areas which are formed by dividing an object area of the two display areas, which includes one point within a predetermined range from the touch position, with the second boundary line as first and second display areas in place of the object area.

The above portable terminal determines the second boundary line, based on the touch position on the touch pad and divides one (object area) of the two display areas by the determined second boundary line. Therefore, according to the portable terminal, when the display surface of the display panel has been already divided into two, it is possible to further increase the number of divisions.

(b) In the above portable terminal, the display surface may be substantially rectangular, the first boundary line may be a normal line to any one side of the display surface, and the area management unit may determine a normal line to the first boundary line as the second boundary line.

This portable terminal divides one (object area) of the two display areas, which are formed by dividing the display surface with the first boundary line which is the normal line to one side of the display surface having a substantially rectangular shape, by the second boundary line which is the normal line to the first boundary line. Thus, each display area also has a substantially rectangular shape. Hence, according to this portable terminal, it is possible to easily perform the control on the display, compared to a case where each display area is not substantially rectangular.

(c) Further, in the above portable terminal, when the touch position on the touch pad is moved, the area management unit may determine, as the object area, a display area including two points which are distant from each other by a first distance or larger in a normal line direction to the first boundary line on a moving locus of the touch position, the first distance having a predetermined ratio relative to a line length from one side of the display surface, which faces the first boundary line, to the first boundary line.

According to this portable terminal, by appropriately setting the first distance, a user changes the moving distance in an operation (a drag operation) of moving a finger with the finger being touched on the touch pad, so that it is possible to designate whether to divide the object area by the operation or to perform the other normal drag operation.

(d) Further, in the above portable terminal, the area management unit may determine, as the two points distant from each other by the first distance or larger, a point within a second distance from the first boundary line in a direction where a side of the display surface facing the first boundary line exists and a point within a third distance from the side of the display surface.

According to this portable terminal, by appropriately setting the second distance and the third distance, it is possible to divide the object area by an intuitive operation of cutting the display surface in which the finger and the like is moved from a position adjacent to the first boundary line to a position adjacent to the side of the display surface facing the first boundary line with the finger and the like being touched.

(e) Further, in the above portable terminal, when the moving locus of the touch position includes two points distant from each other by a distance longer than a second distance, the area management unit may further define two areas which are formed by dividing another display area than the object area of the two display areas formed by dividing the display surface with the first boundary line with the second boundary line, as third and fourth display areas in place of the other display area, the second distance being longer than the first distance and having a predetermined ratio relative to a line length from one side of the display surface, which faces the first boundary line, to another side of the display surface, which faces the one side in the normal line direction to the first boundary line.

According to this portable terminal, by appropriately setting the second distance longer than the first distance, the user changes the moving distance in the operation of moving the finger with the finger being touched on the touch pad, so that it is possible to designate whether to divide only the object area or to divide both of the two display areas formed by dividing the display surface with the first boundary line.

(f) Further, in the above portable terminal, when the touch position detected by the touch pad after defining the first and second display areas is moved to follow at least a part of the second boundary line, the area management unit may define an area formed by combining the first and second display areas as one display area, in place of the first and second display areas.

According to this portable terminal, it is possible to combine the first and second display areas, which are divided with the second boundary line, by a simple operation (drag operation) of following at least a part of the second boundary line. As a result, for example, when it is not necessary to display the image in any one display area of the first and second display areas, it is possible to largely display the image, which is necessarily displayed, in one display area formed by combining the two display areas.

(g) Further, in the above portable terminal, the display control unit may display the first boundary line on the display panel, and the display control unit may further display the second boundary line on the display panel when the area management unit defines the first and second display areas.

This portable terminal displays the first boundary line, and displays the second boundary line when the object area is divided by the second boundary line. Thus, the user can recognize at one view how the display surface is currently divided by seeing the display of the boundary line.

(h) Further, in the above portable terminal, when the area management unit defines the area obtained by combining the first and second display areas as one display area, the display control unit may delete the second boundary line having been displayed on the display panel.

When the first and second display areas divided by the second boundary line are combined, the portable terminal disables the second boundary line from being displayed. Therefore, the user can recognize at one view how the display surface is currently divided by seeing the display of the boundary line.

(i) Further, in the above portable terminal, when the area management unit defines the first and second display areas, the display control unit may perform the control such that a part or whole of the image displayed in the object area just before defining the first and second display areas is displayed in each of the first and second display areas.

According to this portable terminal, when a size of the image displayed in the object area is relatively large, it is possible to display the different parts of the image in each of the first and second display areas, for example. Hence, the user can see the different parts of the image at the same time.

(j) Further, in the above portable terminal, when the area management unit defines the first and second display areas, the display control unit may perform the control such that a part or whole of the image being displayed in the object area just before defining the first and second display areas is displayed in the first display area and that an image relating to the image being displayed in the object area is displayed in the second display area.

According to this portable terminal, when the user intends to display an image relating to the image displayed in the object area, in one area obtained by dividing the object area, the user can perform the display simply by performing the operation of dividing the object area. As a result, it is possible to reduce an operation burden for the display.

(k) Further, in the above portable terminal, after the area management unit defines the first and second display areas, when the touch position on the touch pad is moved from a point in one of the first and second display areas to a point in the other of the first and second display areas distant by a distance smaller than a first distance, the display control unit may perform the control such that the images being displayed in the first and second display areas before the movement of the touch position are switched, the first distance having a predetermined ratio relative to a line length from one side of the display surface, which faces the first boundary line, to the first boundary line in a normal line direction to the first boundary line.

According to this portable terminal, it is possible to switches the positions of images being displayed in the first and second display areas simply by performing the operating of moving a finger and the like from a position of one of the first and second display areas to a position of the other with the finger and the like being touched such that a length in the direction of the second boundary line is shorter than when dividing the object area.

(15) The display panel 110 of the portable phone 100 is an example of the display panel having the display surface with the touch pad of the portable terminal. The area management unit 131 and the display control unit 133 of the portable phone 100 are examples of the area management unit and the display control unit.

The portable terminal of the present invention is used for a case where the display surface of the display panel is divided into a plurality of display areas and images are displayed in the respective display areas.

What is claimed is:

1. A portable terminal comprising:
   a display panel including a display surface having a touch pad;
   an area management unit which defines a plurality of display areas formed by dividing the display surface in response to a touch operation on the touch pad; and
   a display control unit which performs control on an image display in each of the display areas formed by dividing the display surface, wherein
   in a state where two display areas are defined by dividing the display surface with a first boundary line, in response to a touch operation on the touch pad, the area management unit determines, based on a touch position of the touch operation, a second boundary line passing one point on the first boundary line and one point within a predetermined range from the touch position and defines two areas which are formed by dividing an object area of the two display areas with the second boundary line, as first and second display areas in place of the object area, the object area including one point within a predetermined range from the touch position, the display surface is substantially rectangular, the first boundary line is a normal line to any one side of the display surface, the area management unit determines a normal line to the first boundary line as the second boundary line, and when the area management unit defines the first and second display areas, the display control unit performs the control such that a part or whole of the image displayed in the object area just before defining the first and second display areas is displayed in each of the first and second display areas.

2. The portable terminal according to claim 1, wherein when the touch position on the touch pad is moved, the area management unit determines, as the object area, a display area including two points which are distant from each other by a first distance or larger in a normal line direction to the first boundary line on a moving locus of the touch position, the first distance having a predetermined ratio relative to a line length from one side of the display surface, which faces the first boundary line, to the first boundary line.

3. The portable terminal according to claim 2, wherein the area management unit determines, as the two points distant from each other by the first distance or larger, a point within a second distance from the first boundary line in a direction where a side of the display surface facing the first boundary line exists and a point within a third distance from the side of the display surface.

4. The portable terminal according to claim 2, wherein when the moving locus of the touch position includes two points distant from each other by a distance longer than a second distance, the area management unit further defines two areas which are formed by dividing another display area than the object area of the two display areas formed by dividing the display surface with the first boundary line with the second boundary line, as third and fourth display areas in place of the other display area, the second distance being longer than the first distance and having a predetermined ratio relative to a line length from one side of the display surface, which faces the first boundary line, to another side of the display surface, which faces the one side in the normal line direction to the first boundary line.

5. A portable terminal comprising:

a display panel including a display surface having a touch pad;

an area management unit which defines a plurality of display areas formed by dividing the display surface in response to a touch operation on the touch pad; and a display control unit which performs control on an image display in each of the display areas formed by dividing the display surface, wherein in a state where two display areas are defined by dividing the display surface with a first boundary line, in response to a touch operation on the touch pad, the area management unit determines, based on a touch position of the touch operation, a second boundary line passing one point on the first boundary line and one point within a predetermined range from the touch position and defines two areas which are formed by dividing an object area of the two display areas with the second boundary line, as first and second display areas in place of the object area, the object area including one point within a predetermined range from the touch position, the display surface is substantially rectangular, the first boundary line is a normal line to any one side of the display surface, the area management unit determines a normal line to the first boundary line as the second boundary line, and when the touch position detected by the touch pad after defining the first and second display areas is moved along the second boundary line to follow at least a part of the second boundary line, the area management unit defines an area formed by combining the first and second display areas as one display area, in place of the first and second display areas.

6. The portable terminal according to claim 1, wherein the display control unit displays the first boundary line on the display panel, and wherein the display control unit further displays the second boundary line on the display panel when the area management unit defines the first and second display areas.

7. The portable terminal according to claim 6, wherein when the area management unit defines the area obtained by combining the first and second display areas as one display area, the display control unit deletes the second boundary line having been displayed on the display panel.

8. The portable terminal according to claim 5, wherein when the area management unit defines the first and second display areas, the display control unit performs the control such that a part or whole of the image being displayed in the object area just before defining the first and second display areas is displayed in the first display area and that an image relating to the image being displayed in the object area is displayed in the second display area.

9. The portable terminal according to claim 1, wherein after the area management unit defines the first and second display areas, when the touch position on the touch pad is moved from a point in one of the first and second display areas to a point in the other of the first and second display areas distant by a distance smaller than a first distance, the display control unit performs the control such that the images being displayed in the first and second display areas before the movement of the touch position are switched, the first distance having a predetermined ratio relative to a line length from one side of the display surface, which faces the first boundary line, to the first boundary line in a normal line direction to the first boundary line.

10. A control method of a portable terminal including a display panel including a display surface having a touch pad, the control method comprising:

defining a plurality of display areas formed by dividing the display surface in response to a touch operation on the touch pad; and performing control on an image display in each of the display areas formed by dividing the display surface, wherein in a state where two display areas are defined by dividing the display surface with a first boundary line, in response to a touch operation on the touch pad, the defining step determines, based on a touch position of the touch operation, a second boundary line passing one point and one point within a predetermined range from the touch position to define two areas which are formed by dividing an object area of the two display areas with the second boundary line as first and second display areas in place of the object area, the object area including one point within a predetermined range from the touch position, the display surface is substantially rectangular, the first boundary line is a normal line to any one side of the display surface; and the control method further comprises:

determining a normal line to the first boundary line as the second boundary line; and with defining the first and second display areas, performing the control such that a part or whole of the image displayed in the object area just before defining the first and second display areas is displayed in each of the first and second display areas.

11. A non-transitory computer readable storage medium having a control program stored thereon and readable by a processor of a portable terminal including a display panel including a display surface having a touch pad, the control program, when executed by the processor, causing the processor to perform operations comprising:

defining a plurality of display areas formed by dividing the display surface in response to a touch operation on the touch pad; and performing control on an image display in each of the display areas formed by dividing the display surface, wherein in a state where two display areas are defined by dividing the display surface with a first boundary line, in response to a touch operation on the touch pad, the defining step determines, based on a touch position of the touch operation, a second boundary line passing one point and one point within a predetermined range from the touch position to define two areas which are formed by dividing an object area of the two display areas with the second boundary line as first and second display areas in place of the object area, the object area including one point within a predetermined range from the touch position, the display surface is substantially rectangular, the first boundary line is a normal line to any one side of the display surface, and the operations further comprises:

determining a normal line to the first boundary line as the second boundary line; and performing the control such that a part or whole of the image displayed in the object area just before defining the first and second display areas is displayed in each of the first and second display areas.

* * * * *